US012745077B2

(12) United States Patent
Rajadurai et al.

(10) Patent No.: US 12,745,077 B2
(45) Date of Patent: Sep. 22, 2026

(54) METHOD AND SYSTEMS FOR AUTHENTICATING UE FOR ACCESSING NON-3GPP SERVICE

(71) Applicant: Samsung Electronics Co., Ltd., Suwon-si (KR)

(72) Inventors: Rajavelsamy Rajadurai, Bangalore (IN); Rohini Rajendran, Bangalore (IN); Nivedya Parambath Sasi, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 336 days.

(21) Appl. No.: 18/270,601

(22) PCT Filed: Dec. 29, 2021

(86) PCT No.: PCT/KR2021/020181
§ 371 (c)(1),
(2) Date: Jun. 30, 2023

(87) PCT Pub. No.: WO2022/146034
PCT Pub. Date: Jul. 7, 2022

(65) Prior Publication Data

US 2024/0298174 A1 Sep. 5, 2024

(30) Foreign Application Priority Data

Dec. 31, 2020 (IN) ............................ 202041057467
Dec. 14, 2021 (IN) ............................ 2020 41057467

(51) Int. Cl.
*H04W 12/06* (2021.01)
*H04L 9/40* (2022.01)
(Continued)

(52) U.S. Cl.
CPC ......... *H04W 12/06* (2013.01); *H04L 63/0892* (2013.01); *H04W 12/72* (2021.01); *H04W 84/12* (2013.01)

(58) Field of Classification Search
CPC ..... H04W 12/06; H04W 12/72; H04W 84/12; H04W 12/03; H04W 12/069;
(Continued)

(56) References Cited

U.S. PATENT DOCUMENTS 9,344,890 B2 5/2016 Faccin et al.
9,467,962 B2 10/2016 Liu et al.
(Continued)

FOREIGN PATENT DOCUMENTS

WO 2009/089762 A1 7/2009
WO 2013/041041 A1 3/2013
(Continued)

OTHER PUBLICATIONS

3GPP; 3rd Generation Partnership Project; Technical Specification Group Services and System Aspects; Security architecture and procedures for 5G system (Release 17); 3GPP TS 33.501; V17.0.0; (Dec. 2020); Dec. 16, 2020; Valbonne, France.
(Continued)

*Primary Examiner* — Nimesh Patel
(74) *Attorney, Agent, or Firm* — Jefferson IP Law, LLP

(57) ABSTRACT

The present disclosure relates to a pre-5th-Generation (5G) or 5G communication system to be provided for supporting higher data rates Beyond 4th-Generation (4G) communication system such as Long Term Evolution (LTE). A method disclosed herein includes authenticating a User Equipment (UE) using a 3rd Generation Partnership Project (3GPP) subscription credential for accessing non-3GPP services from a non-3GPP network. The method includes authenticating the UE before allowing access to the non-3GPP
(Continued)

UE
WLAN-AP
N3IWF/AAA-P/ Relay Authenticator
AMF
AUSF/AAA-S
UDM
1. Connection establishment
2. EAP Request-Identity
3. EAP Response-Identity [NAI/SUCI/5G-GUTI, Routing ID (optional)]
4. Routing message to appropriate Auth server
5. EAP Response-Identity [NAI/SUCI/5G-GUTI, Routing ID (optional)]
6a. Retrieve Authentication vectors (retrieving SUPI if 5G-GUTI is received)
6b. User ID request (5G-GUTI)
6c. User ID response (SUPI)
7. EAP Request (ANY Identity)
8. EAP Request (ANY Identity)
9. EAP response (Identity)
10. EAP response (Identity)
If not Available retrieves from UDM (in step 12). Verifies that the subcriber is authorized to use the WLAN service
11. Check WLAN access profile
12. Retrieve WLAN Access profile
13. WLAN Access Authentication (EAP-AKA'/5G-AKA/EAP-TLS)
14. Derive $K_{WLAN}$
15. Authentication successful
15. Authentication successful
16. IKEv2 Tunnel EStablishment using Key derived from previous Authentication ($K_{WLAN}$)

services from the non-3GPP network. The method further includes using 3GPP security credentials for authenticating the UE to access the non-3GPP services from the non-3GPP network.

18 Claims, 17 Drawing Sheets

(51) Int. Cl.
*H04W 12/72* (2021.01)
*H04W 84/12* (2009.01)

(58) Field of Classification Search
CPC ..... H04W 12/04; H04W 12/08; H04W 88/14; H04W 12/041; H04W 4/70; H04W 4/80; H04W 12/02; H04W 76/14; H04W 12/35; H04W 12/40; H04W 24/02; H04W 8/20; H04W 8/26; H04W 60/04; H04W 12/0431; H04W 12/088; H04W 12/12; H04L 63/0892; H04L 9/3066; H04L 9/0825; H04L 9/14; H04L 9/0841; H04L 9/0844; H04L 9/3247; H04L 67/56; H04L 9/085; H04L 9/006; H04L 9/3242; H04L 9/3263; H04L 9/3273; H04L 2012/2841; H04L 63/0272; H04L 2209/80; H04L 63/10; H04L 41/0894; H04L 41/16; H04L 63/029; H04L 63/083; H04L 63/0861; H04L 63/0876; Y02D 30/70; G06F 21/30; G06F 21/32; G06F 21/35; G06F 2009/45595; G06N 3/09; G06N 3/02; G06N 3/045; G06N 3/0464; G06N 20/00; H04M 2203/609; H04M 2207/185; H04M 2203/2011

See application file for complete search history.

(56) References Cited

U.S. PATENT DOCUMENTS 10,117,100 B2 10/2018 John et al.
2003/0236982 A1* 12/2003 Hsu .......................... H04L 63/08 713/171
2013/0308531 A1* 11/2013 So .......................... H04W 76/12 370/328
2014/0185603 A1* 7/2014 Kaippallimalil ...... H04L 63/162 370/338
2015/0020168 A1* 1/2015 Faccin ................ H04W 12/069 726/4
2018/0124597 A1* 5/2018 Malthankar ......... H04L 63/0407
2020/0162269 A1* 5/2020 Nix ....................... H04L 9/3066
2020/0252850 A1* 8/2020 Zhong ............... H04W 36/1446
2022/0338000 A1* 10/2022 Lee ....................... H04W 12/71
2022/0408249 A1* 12/2022 Zamora ................. H04W 12/06

FOREIGN PATENT DOCUMENTS

WO 2016/113420 A1 7/2016
WO 2020/030851 A1 2/2020

OTHER PUBLICATIONS

3GPP; 3rd Generation Partnership Project; Technical Specification Group Services and System Aspects; Study on non-seamless WLAN Offload in 5GS using 3GPP credentials; (Release 17); 3GPP TR 33.881; V0.2.0; (Aug. 2021); Sep. 8, 2021; Valbonne, France.
3GPP; 3rd Generation Partnership Project; Technical Specification Group Services and System Aspects; Security architecture and procedures for 5G system (Release 17); 3GPP TS 33.501; V17.4.0; (Dec. 2021); Dec. 23, 2021; Valbonne, France.
3GPP; 3rd Generation Partnership Project; Technical Specification Group Core Network and Terminals; Numbering, addressing and identification; (Release 17); 3GPP TS 23.003; V17.5.0; (Mar. 2022); Mar. 18, 2022; Valbonne, France.
3GPP; 3rd Generation Partnership Project; Technical Specification Group Core Network and Terminals; Numbering, addressing and identification; (Release 17); 3GPP TS 23.003; V17.8.0; (Dec. 2022); Dec. 15, 2022.
International Search Report with Written Opinion dated Mar. 23, 2022; International Appln. No. PCT/KR2021/020181.
Indian Office Action dated Jul. 21, 2022; Indian Appln. No. 202041057467.
Indian Notice of Hearing dated Apr. 6, 2026, issued in Indian Patent Application No. 202041057467.
ETSI TS 129 273 V16.10; Universal Mobile Telecommunications System (UMTS); LTE; 5G; Evolved Packet System (EPS); 3GPP EPS AAA interfaces, 3GPP TS 29.273 version 16.1.0 Release Nov. 16, 2020.
Korean Office Action dated Jul. 27, 2026, issued in Korean Patent Application No. 10-2023-7023743.

* cited by examiner

FIG. 1C

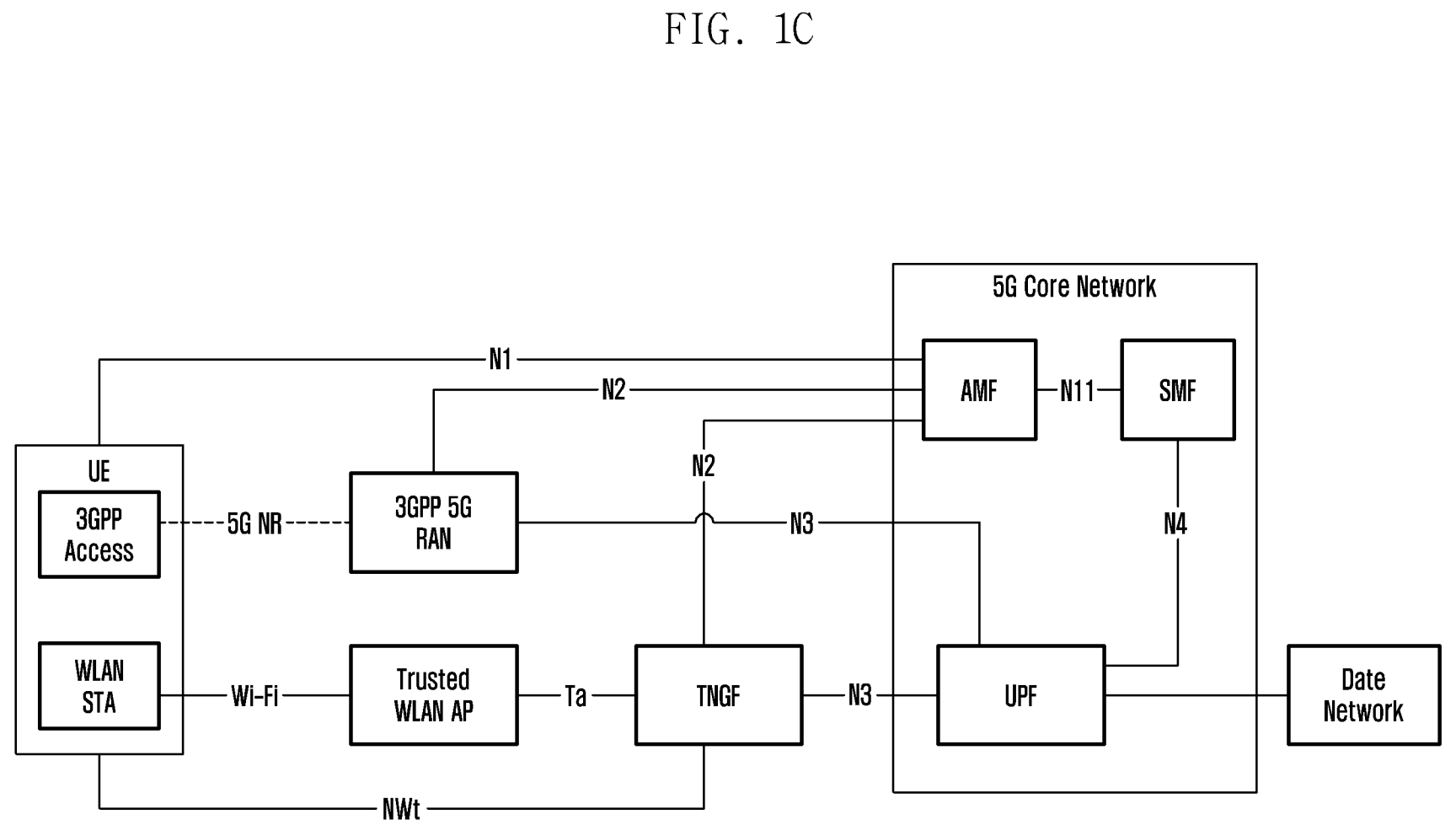

UE
3GPP Access
WLAN STA
5G NR
Wi-Fi
3GPP 5G RAN
Trusted WLAN AP
N1
N2
Ta
NWt
TNGF
N2
N3
N3
5G Core Network
AMF
N11
SMF
N4
UPF
Date Network

Figure 2:
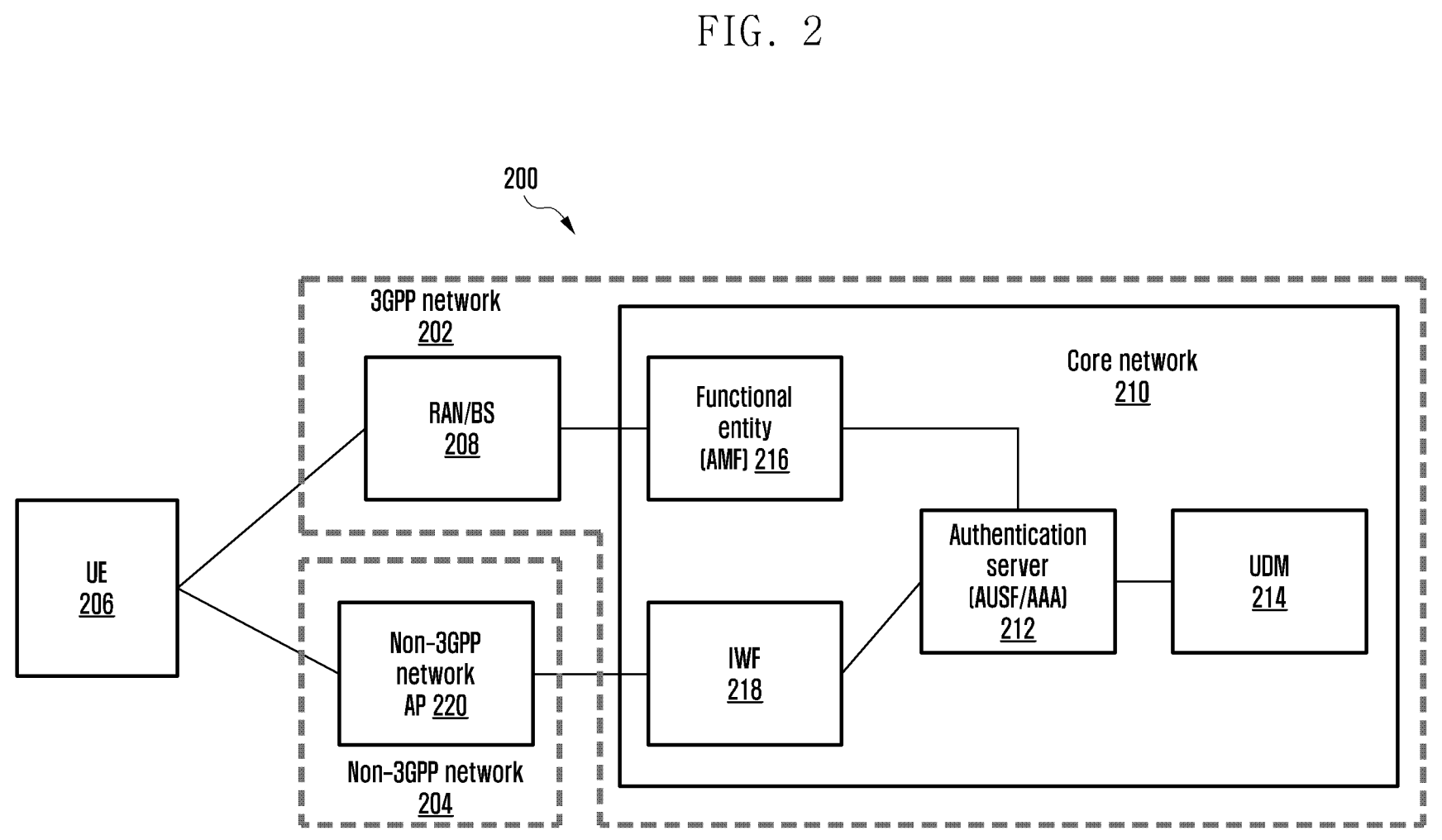

3GPP network 202

RAN/BS 208

Core network 210

Functional entity (AMF) 216

Authentication server (AUSF/AAA) 212

UDM 214

IWF 218

Non-3GPP network AP 220

Non-3GPP network 204

Figure 6:
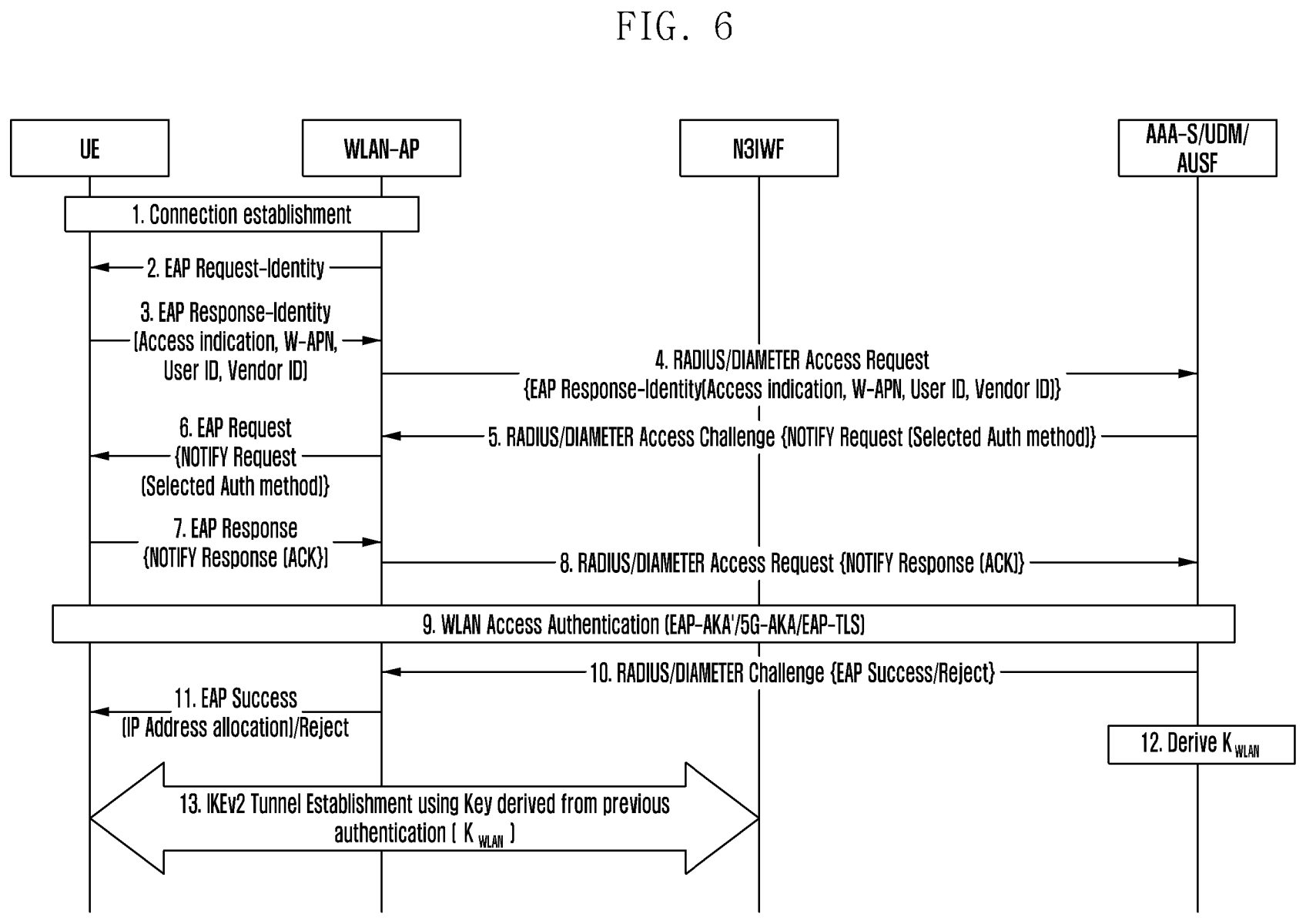

UE
WLAN-AP
N3IWF
AAA-S/UDM/AUSF

1. Connection establishment
2. EAP Request-Identity
3. EAP Response-Identity (Access indication, W-APN, User ID, Vendor ID)
4. RADIUS/DIAMETER Access Request {EAP Response-Identity(Access indication, W-APN, User ID, Vendor ID)}
5. RADIUS/DIAMETER Access Challenge {NOTIFY Request {Selected Auth method}}
6. EAP Request {NOTIFY Request (Selected Auth method)}
7. EAP Response {NOTIFY Response (ACK)}
8. RADIUS/DIAMETER Access Request {NOTIFY Response (ACK)}
9. WLAN Access Authentication (EAP-AKA'/5G-AKA/EAP-TLS)
10. RADIUS/DIAMETER Challenge {EAP Success/Reject}
11. EAP Success (IP Address allocation)/Reject
12. Derive $K_{WLAN}$
13. IKEv2 Tunnel Establishment using Key derived from previous authentication ( $K_{WLAN}$ )

Figure 8:
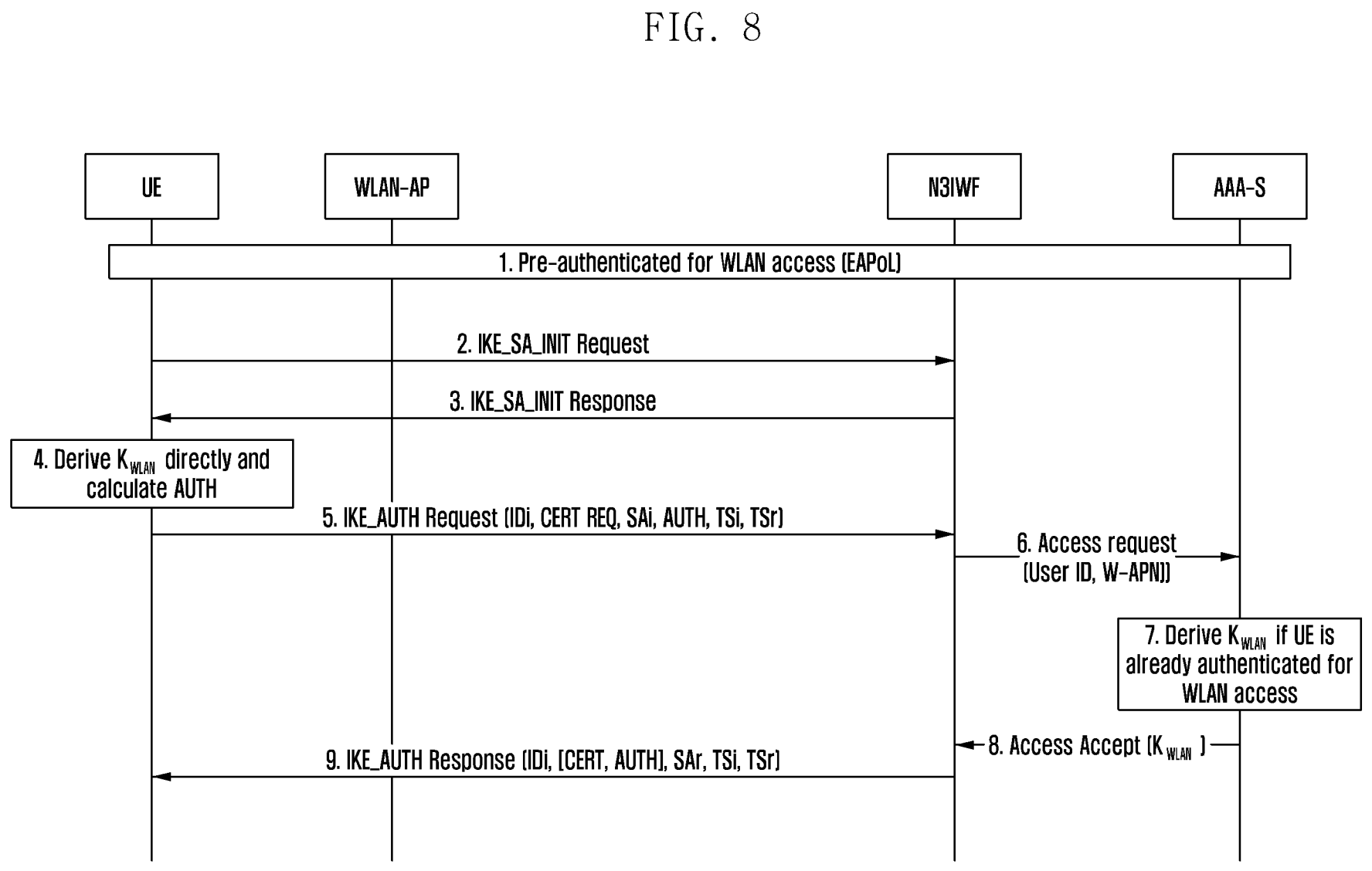

WLAN-AP

N3IWF

AAA-S

1. Pre-authenticated for WLAN access (EAPoL)

2. IKE_SA_INIT Request

3. IKE_SA_INIT Response

4. Derive $K_{WLAN}$ directly and calculate AUTH

5. IKE_AUTH Request (IDi, CERT REQ, SAi, AUTH, TSi, TSr)

6. Access request (User ID, W-APN)

7. Derive $K_{WLAN}$ if UE is already authenticated for WLAN access

8. Access Accept ($K_{WLAN}$)

9. IKE_AUTH Response (IDi, [CERT, AUTH], SAr, TSi, TSr)

Figure 9:
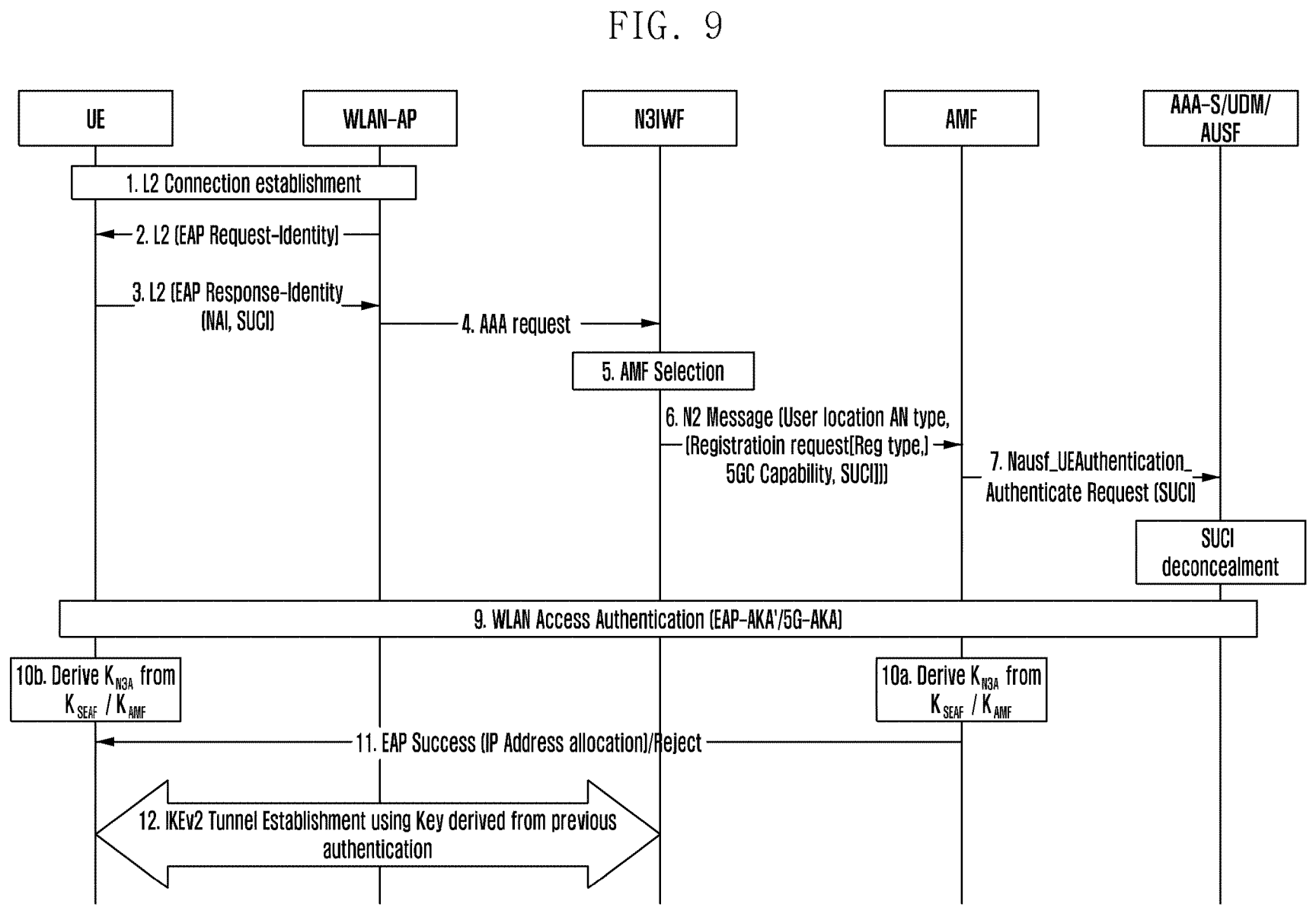

WLAN-AP

N3IWF

AMF

AAA-S/UDM/AUSF

1. L2 Connection establishment

2. L2 (EAP Request-Identity)

3. L2 (EAP Response-Identity (NAI, SUCI))

4. AAA request

5. AMF Selection

6. N2 Message (User location AN type, (Registratioin request(Reg type,) 5GC Capability, SUCI))

7. Nausf_UEAuthentication_Authenticate Request (SUCI)

SUCI deconcealment

9. WLAN Access Authentication (EAP-AKA'/5G-AKA)

10a. Derive $K_{N3A}$ from $K_{SEAF}$ / $K_{AMF}$

10b. Derive $K_{N3A}$ from $K_{SEAF}$ / $K_{AMF}$

11. EAP Success (IP Address allocation)/Reject

12. IKEv2 Tunnel Establishment using Key derived from previous authentication

FIG. 10

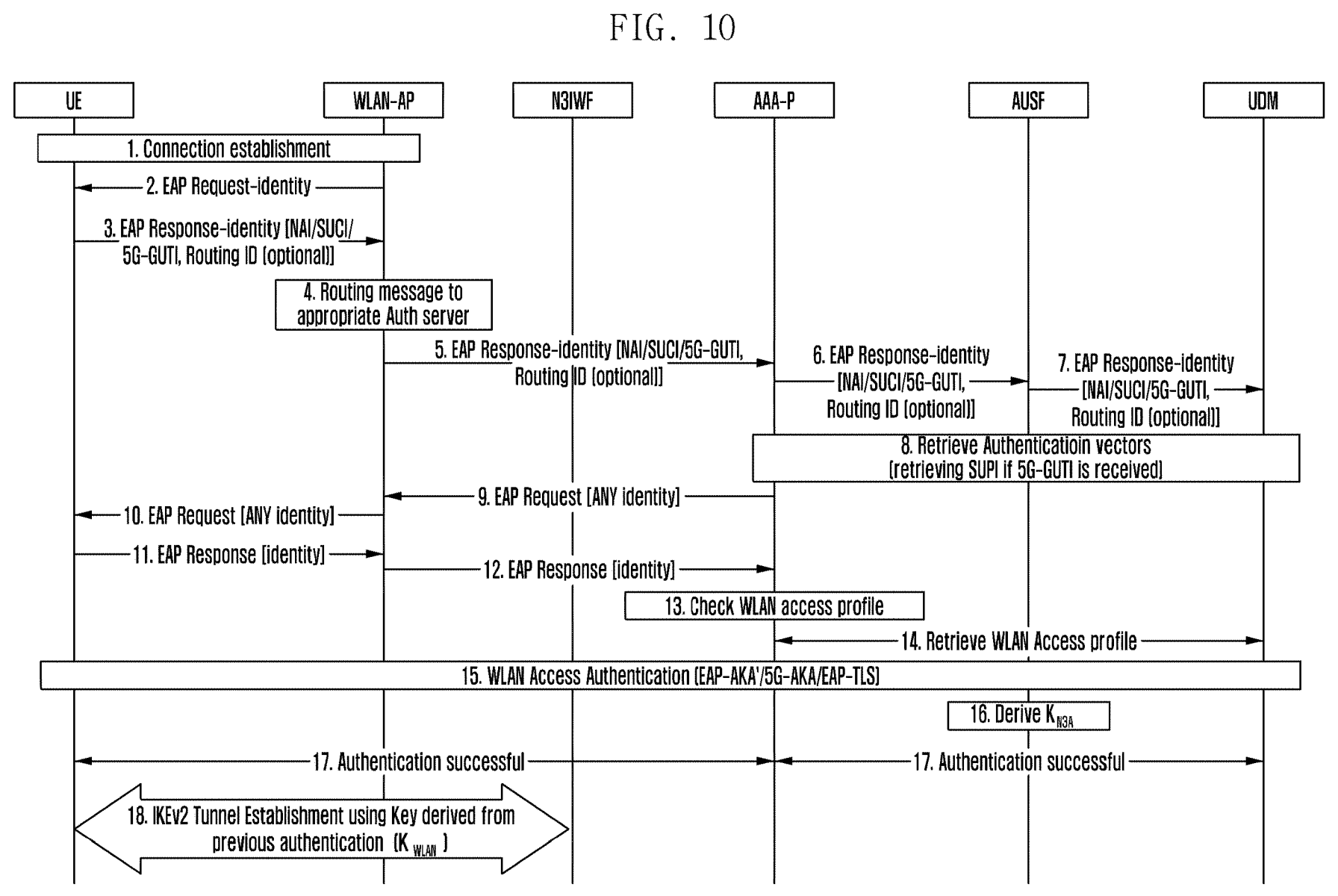

UE
WLAN-AP
N3IWF
AAA-P
AUSF
UDM
1. Connection establishment
2. EAP Request-identity
3. EAP Response-identity [NAI/SUCI/5G-GUTI, Routing ID (optional)]
4. Routing message to appropriate Auth server
5. EAP Response-identity [NAI/SUCI/5G-GUTI, Routing ID (optional)]
6. EAP Response-identity [NAI/SUCI/5G-GUTI, Routing ID (optional)]
7. EAP Response-identity [NAI/SUCI/5G-GUTI, Routing ID (optional)]
8. Retrieve Authenticatioin vectors (retrieving SUPI if 5G-GUTI is received)
9. EAP Request [ANY identity]
10. EAP Request [ANY identity]
11. EAP Response [identity]
12. EAP Response [identity]
13. Check WLAN access profile
14. Retrieve WLAN Access profile
15. WLAN Access Authentication [EAP-AKA'/5G-AKA/EAP-TLS]
16. Derive $K_{N3A}$
17. Authentication successful
17. Authentication successful
18. IKEv2 Tunnel Establishment using Key derived from previous authentication ($K_{WLAN}$)

METHOD AND SYSTEMS FOR AUTHENTICATING UE FOR ACCESSING NON-3GPP SERVICE

TECHNICAL FIELD

The present disclosure relates to the field of communication systems and more particularly to authenticating a User Equipment (UE) using a 3rd Generation Partnership Project (3GPP) subscription credential for accessing non-3GPP services from a non-3GPP network.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

DISCLOSURE OF INVENTION

Technical Problem

In general, a 5G-Wireless Local Area Network (WLAN) interworking system operates by establishing an end-to-end Internet Protocol (IP) tunnel between a User Equipment (UE) and a 3rd Generation Partnership Project (3GPP) system through a WLAN. In the 5G-WLAN interworking system, the UE has to be authenticated when the UE wants to connect to a WLAN AP for availing Non-Seamless WLAN Offload (NSWO). Otherwise, the NSWO may be misused by a fraudulent UE. The fraudulent UE accessing the WLAN AP without the authentication may consume WLAN resources and prevent the legitimate UE from accessing the NSWO, which may cause distributed denial-of-service (DDOS) attack for the UE that has subscription to access the NSWO. In conventional approaches, the WLAN AP may support only an Extensible Authentication Protocol (EAP) authentication procedure over a Radius/Diameter interface to an operator owned Authentication, Authorization, and Accounting (AAA). However, such a procedure assigns an Internet Protocol (IP) address to the UE before authenticating the UE to access the NSWO. Thus, the NSWO may be misused by the fraudulent UE.

In order to prevent the fraudulent UE from accessing the NSWO, a NSWO authentication procedure has to performed for authenticating the UE using credentials of the UE defined in a Unified Data Management (UDM) of a 5G core network (5GC) (i.e., using 3GPP core network). However, the conventional approaches do not involve any mechanisms to support the authentication of the UE to access the NSWO by the 5GC by ensuring that re-use of an existing service operation for NSWO scenarios does not pose any security threats.

FIG. 1*a* depicts an example architecture of an untrusted 5G-WLAN interworking system. In the untrusted 5G-WLAN interworking system, an untrusted WLAN access is integrated with the 5GC via the N3IWF. A loose coupling exists between the N3IWF and the WLAN access over a Y2 interface through a generic IP transport. An NWu interface establishes IPsec security associations (SAs) between the UE and the N3IWF for secure transport of a 5G NAS signaling and user data. The IPsec SAs over the NWu apply both encryption and/or integrity protection for a 5G NAS signalling and user data, since the WLAN access is untrusted in the untrusted 5G-WLAN interworking system. An example security model for the untrusted WLAN access is depicted in FIG. 1*b*. In the conventional approaches, the 3GPP defined security procedure for the untrusted non-3GPP access to the 5GC IP address allocation is performed without prior authentication and authorization of the UE.

FIG. 1*c* depicts an example architecture of a trusted 5G-WLAN interworking system. In the trusted 5G-WLAN interworking system, a trusted WLAN Access Point (AP) is integrated with the 5GC via a Trusted Non-3GPP Gateway Function (TNGF). A tight coupling exits between the TNGF, and the trusted WLAN AP over a AAA based interface Ta, tying a WLAN layer-2 authentication to a key derived from the TNGF after successful authentication of the UE with the 5GC. The NWt interface establishes the IPsec SAs between the UE and the TNGF for the transport of the 5G NAS signalling and the user data like NWu. However, the IPsec SAs over the NWt apply a NULL encryption for the 5G NAS signaling and the user data since WLAN layer-2 encryption is trusted in the trusted 5G-WLAN interworking system.

Further, there may be devices referred to Non-5G-Capable over WLAN (N5CW) devices, which do not support the 5G NAS signalling over the trusted WLAN access. Such devices require the 3GPP access on the UE to support protocols such as, but are not limited to, an EAP-5G protocol, an Internet key exchange version two (IKEv2) protocol, an Encapsulating Security Payload (ESP) protocol, or the like. The N5CW devices may still connect to the 5GC over the trusted WLAN AP, if a Trusted WLAN Interworking Function (TWIF) gateway function is supported for the WLAN AP, as depicted in FIG. 1*d*. The TWIF performs a registration and Protocol Data Unit (PDU) session management on behalf of the N5CWF devices with the 5GC over an N1 interface. The authentication of the UE with the 5GC over the WLAN AP may be performed through the TWIF similar to the TNGF with EAP authentication messages transported over an Yw interface. The N5CW devices may be assumed to have a Universal Subscriber Identity Module (USIM) and may be authenticated with the 5GC using an Extensible Authentication Protocol Method for 3rd Generation Authentication and Key Agreement (EAP-AKA) (as described in clause 7A.2.4, TS 33.501).

As per the existing procedure in clause 7.2.1 of the 3GPP TS 33.501, when the UE decides to connect to the 5GC over the untrusted WLAN access, the UE first connects to and obtains the IP address from the untrusted WLAN access, selects the N3IWF in a Public Land Mobile Network (PLMN), and initiates a procedure to establish the IPsec SA with the selected N3IWF, as shown in FIG. 1*c*.

Thus, the conventional approaches do not involve any mechanisms for optimizing the authentication of the UE authentication before the IP allocation in the untrusted 5G-WLAN interworking system and for special handling of keys derived as part of such early authentication is required.

Solution to Problem

The principal object of the embodiments herein is to disclose methods and systems for authenticating a User Equipment (UE) using a 3rd Generation Partnership Project (3GPP) subscription credential for accessing non-3GPP services from a non-3GPP network.

Another object of the embodiments herein is to disclose methods and systems for authenticating the UE before allocating an Internet Protocol (IP) address to access the non-3GPP services from the non-3GPP network.

Another object of the embodiments herein is to disclose methods and systems for supporting Extensible Authentication Protocol Method for 3rd Generation Authentication and Key Agreement (EAP-AKA') based authentication at an authentication server of a 3GPP network for authenticating the UE.

Another object of the embodiments herein is to disclose methods and systems for deploying an interworking function (IWF) between a non-3GPP network Access Point (AP) and the authentication server for supporting the EAP-AKA' based authentication, isolating the authentication server from a direct access by the non-3GPP network AP and interworking between the non-3GPP network AP and the authentication server based on a Diameter/Radius protocol and a service-based interface.

Another object of the embodiments herein is to disclose methods and systems for deriving a Master Session key (MSK) for establishing a security context between the non-3GPP network AP and the UE, wherein the MSK is derived independent of a current Non-Access Stratum (NAS) security context and a key derived at the authentication server.

Another object of the embodiments herein is to disclose methods and systems for providing an indication to the authentication server for performing a normal network access authentication or a non-3GPP network access authentication and for managing storage of keys derived during the authentication of the UE and authentication related information.

Accordingly, the embodiments herein provide methods and systems for authenticating a User Equipment (UE) using a 3rd Generation Partnership Project (3GPP) subscription credential for accessing non-3GPP services from a non-3GPP network. A method disclosed herein includes sending, by a non-3GPP network Access Point (AP), an identity request to the UE, on establishing a connection by the UE with the non-3GPP network AP. The method includes receiving, by the non-3GPP network AP, an identity response in a Network Access Identifier (NAI) format from the UE in response to the sent identity request. The method includes routing, by the non-3GPP network AP, the identity response to an interworking function (IWF) for an authentication of the UE. The method includes sending, by the IWF, an authentication request to an authentication server using a service-based interface for the authentication of the UE. The method includes determining, by the authentication server, the authentication request received from the IWF is for non-3GPP network access authentication. The method includes retrieving, by the authentication server, an authentication vector (AV) from a Unified Data Management (UDM) for the non-3GPP network access authentication. The method includes initiating, by the authentication server, the authentication with the UE using the AV retrieved from the UDM. The method includes verifying, by the authentication server, whether the authentication initiated with the UE is successful. The method includes generating, by the authentication server, a Master Session Key (MSK) specific to the non-3GPP network access authentication using the AV for the non-3GPP network access authentication, on verifying that the authentication initiated with the UE is successful. The method includes sending, by the authentication server, a success message with the generated MSK to the non-3GPP network access AP through the IWF for allowing the UE to access the non-3GPP services.

Accordingly, the embodiments herein provide a communication system comprising a User Equipment (UE), a non-3rd Generation Partnership Project (3GPP) network Access Point (AP) coupled to the UE, an interworking function (IWF), an authentication server, and a Unified Data Management (UDM). The non-3GPP network AP is configured to send an identity request to the UE, on establishing a connection by the UE with the non-3GPP network AP. The non-3GPP network AP is configured to receive an identity response in a Network Access Identifier (NAI) format from the UE in response to the sent identity request and to route the identity response to the IWF for an authentication of the UE. The IWF is configured to send an authentication request to the authentication server using a service-based interface for the authentication of the UE. The authentication server is configured to determine the authentication request received from the IWF is for the non-3GPP network access authentication. The authentication server is configured to retrieve an authentication vector (AV) from the UDM for the non-3GPP network access authentication. The authentication server is configured to initiate the authentication with the UE using the AV retrieved from the UDM. The authentication server is configured to verify whether the authentication initiated with the UE is successful. On verifying that the authentication initiated with the UE is successful, the authentication server is configured to generate a Master Session Key (MSK) specific to the non-3GPP network access authentication using the AV for the non-3GPP network access authentication. The authentication server is configured to send a success message with the generated MSK to the non-3GPP network access AP through the IWF for allowing the UE to access the non-3GPP services.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

Advantageous Effects of Invention

According to the present disclosure, it is possible to provide security when the UE accesses through a wireless LAN.

BRIEF DESCRIPTION OF DRAWINGS

Embodiments herein are illustrated in the accompanying drawings, throughout which like reference letters indicate corresponding parts in the various figures. The embodiments herein will be better understood from the following description with reference to the drawings, in which:

FIG. 1*c* depicts an example conventional architecture of a trusted 5G-WLAN interworking system, wherein a trusted WLAN access is integrated with the 5GC via a Trusted non-3GPP gateway function (TNGF);

FIG. 2 depicts a communication system, according to embodiments as disclosed herein;

FIG. 6 is an example sequence diagram depicting a process of performing the authentication between the UE and an Authentication, Authorization and Accounting-Server (AAA-S)/Authentication Server Function (AUSF)/ Unified Data Management (UDM) when accessing "WLAN 3GPP IP Access" services (i.e., the non-3GPP services) after WLAN access authentication (i.e., non-3GPP network access authentication), according to embodiments as disclosed herein;

FIG. 8 is an example sequence diagram depicting generation of optimized Internet key exchange version two (IKEv2) mutual authentication keys for a tunnel establishment over the 5G-WLAN interworking system using Extended Master Session key (EMSK) derived during a WLAN access authentication procedure for a tunnel establishment request, according to embodiments as disclosed herein;

FIG. 9 is an example sequence diagram depicting the authentication of the UE using the AMF, wherein a N3IWF selects the AMF, and the AMF/Security Anchor Function (SEAF) derives a key for WLAN radio interface protection from a key KAMF/KSEAF, according to embodiments as disclosed herein;

FIG. 10 is an example sequence diagram depicting the authentication of the UE by an AAA-Proxy (AAA-P) in case of roaming of the UE, according to embodiments as disclosed herein;

MODE FOR THE INVENTION

Figure 1A:
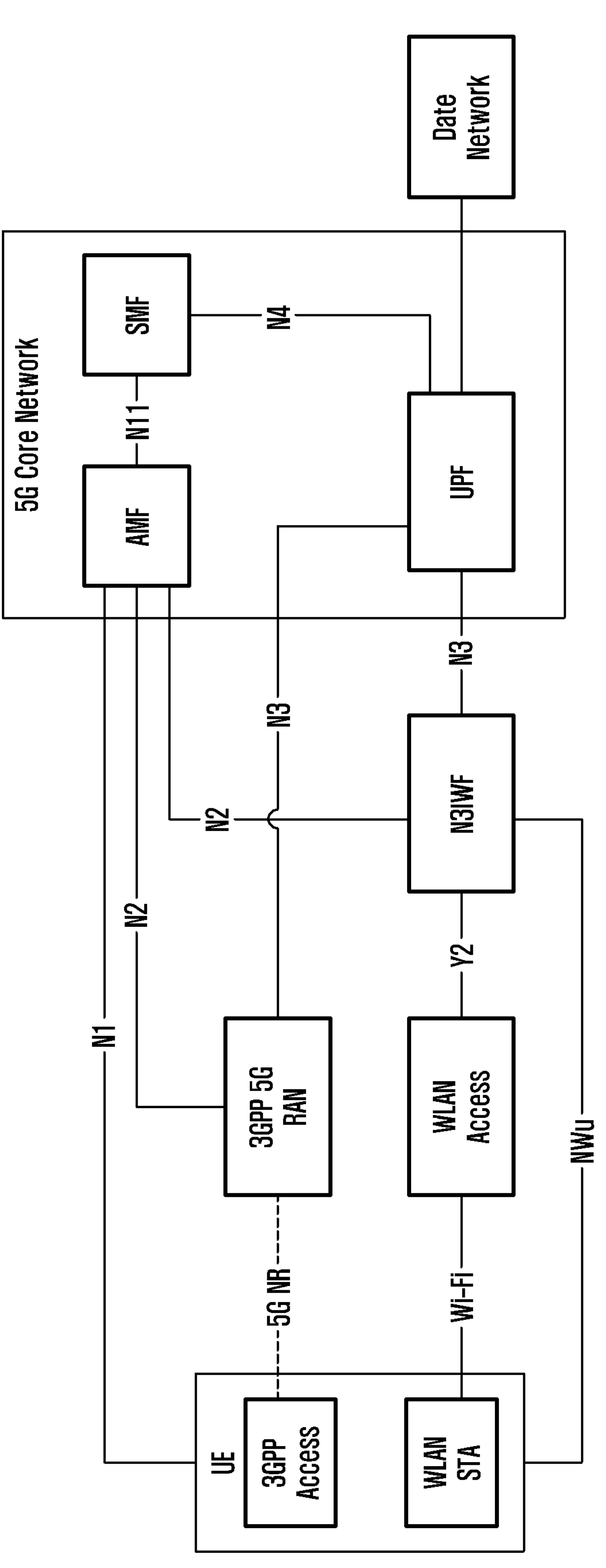
FIG. 1*a* depicts an example conventional architecture of an untrusted 5G-Wireless Local Area Network (WLAN) interworking system, wherein an untrusted WLAN access is integrated with a 5G core network (5GC) via a non-3rd Generation Partnership Project (3GPP) interworking function (N3IWF)
Figure 1B:
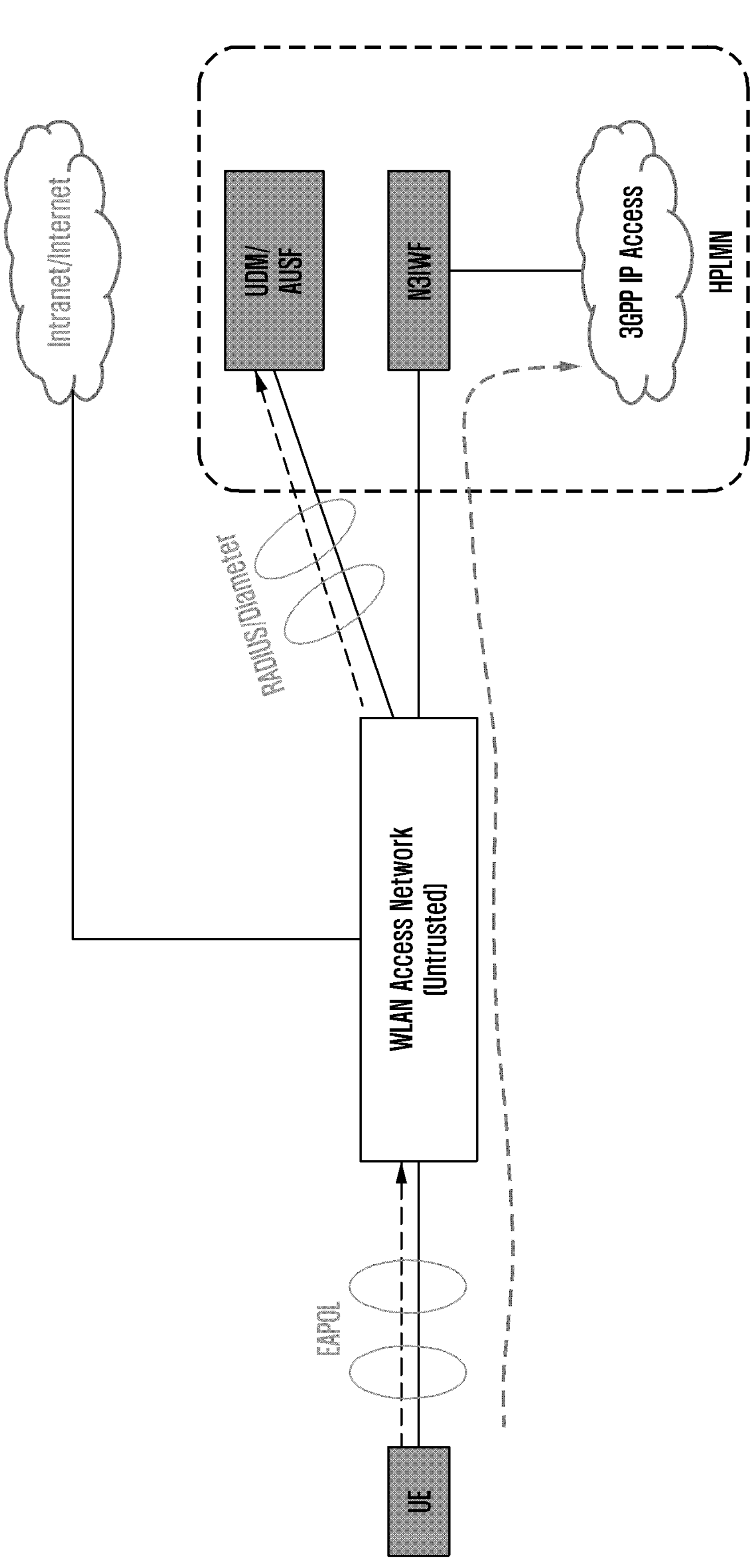
FIG. 1*b* depicts a conventional security model for the untrusted WLAN access in the untrusted WLAN-5G interworking system.
Figure 1D:
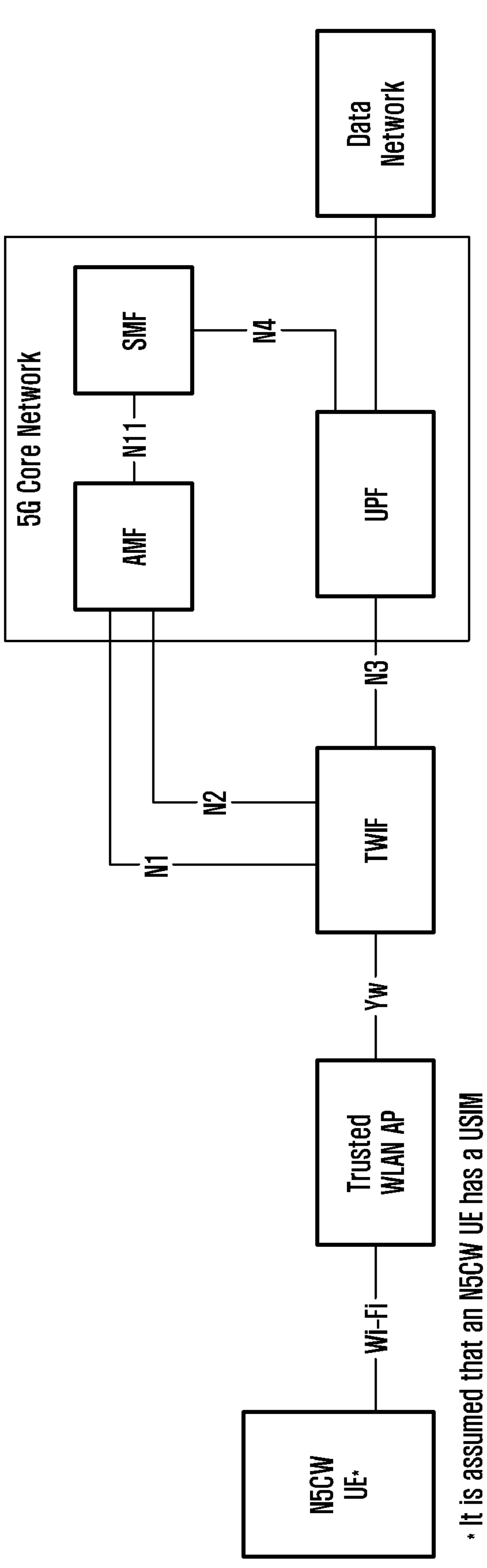
FIG. 1*d* depicts a device connecting to the 5GC over the trusted WLAN access, if a Trusted WLAN Interworking Function (TWIF) is supported for the WLAN access.
Figure 1E:
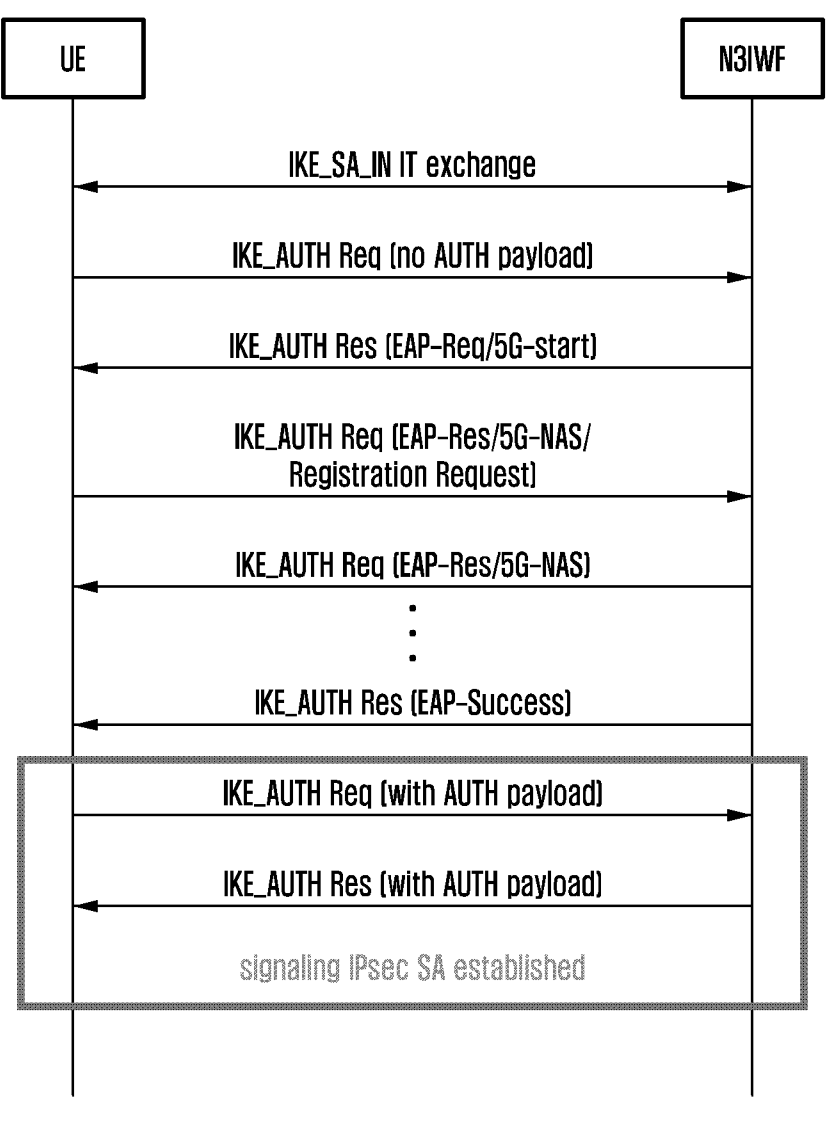
FIG. 1*e* depicts a User Equipment (UE) deciding to connect to the 5GC over the untrusted WLAN access.

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

Embodiments herein disclose methods and systems for authenticating and authorizing a User Equipment (UE) to access non-3rd Generation Partnership Project (3GPP) services from a non-3GPP network. Embodiments herein also disclose methods and systems for enabling the UE to establish an Internet key exchange version two (IKEv2) tunnel establishment procedure with an interworking function (IWF). Embodiments herein also provide an indication to an authentication server or a Unified Data Management (UDM) depicting whether a key handling (storage of keys) to be considered as a normal network access authentication or not to store the keys.

Embodiments herein disclose methods and systems for authentication of a non-3GPP network Access Point (AP) of the non-3GPP network before allocating an Internet Protocol (IP) address. Embodiments herein disclose methods and systems for optimizing indication of special authentication (not to store the keys derived as part of the special authentication) or optimizing a current tunnel authentication for an interworking system comprising the UE, the non-3GPP network AP, the IWF, and the authentication server, wherein the UE has been previously authenticated by the authentication server for accessing the non-3GPP AP.

Embodiments herein also disclose methods and systems for initiating the authentication server or an Access and Mobility Management Function (AMF) to derive a tunnel session key (TSK) for a tunnel establishment. Embodiments herein also disclose methods and systems for deriving the tunnel session key using a Master Session Key (MSK)/Extended Master Session key (EMSK) derived during a previous authentication.

Embodiments herein disclose methods and systems for deriving a new key for an IKEv2 mutual authentication during the tunnel establishment procedure without performing a complete authentication procedure, wherein the key for the associated tunnel establishment procedure is derived during the previous authentication.

Embodiments herein disclose methods and systems for deriving an independent security key, which is neither depend on an established current Non-Access Stratum (NAS) security context nor a key generated at the authentication server.

Embodiments herein disclose methods and systems for performing a combined and interdependent authentication of the UE, where NAS messages have been carried over an EAP encapsulation over Local Area Networks (LANs) (EAPOL) via the AMF.

Embodiments herein disclose methods and systems for deriving a key for non-3GPP radio interface protection, wherein the key is derived using the EMSK derived during the previous authentication. Alternatively, embodiments herein disclose methods and systems for using the EMSK for deriving the key at the authentication server and using the MSK for the non-3GPP radio interface protection. Alternatively, embodiments herein disclose methods and systems for using the EMSK for deriving the key at the authentication server and using the MSK for the non-3GPP radio interface protection, independent of the previous authentication.

Embodiments herein disclose methods and systems for providing an intimation to the authentication server or the AMF to generate the key from the non-3GPP access for the IKEv2 mutual authentication during the tunnel establishment procedure.

Referring now to the drawings, and more particularly to FIGS. 2 through 13, where similar reference characters denote corresponding features consistently throughout the figures, there are shown example embodiments.

The terms "KWLAN" or "KN3A" both refer to WLAN access keys/WLAN keys and are used interchangeably throughout this document.

Throughout the description, embodiments proposed in one solution can be used in combination with embodiments proposed in other solution to arrive at final solution to support authentication of a User Equipment (UE) for accessing non-3GPP network prior to allocation of an Internet Protocol (IP) address.

FIG. 2 depicts a communication system 200, according to embodiments as disclosed herein. The communication system 200 referred herein may be a 3GPP-Non-3rd Generation Partnership Project (3GPP) network interworking system. The communication system 200 includes a 3GPP network 202, a non-3GPP network 204, and at least one User Equipment (UE) 206. In the communication system 200, the non-3GPP network 204 may be integrated with the 3GPP network 202.

The 3GPP network 202 referred herein may include at least one of, a 3rd Generation Partnership Project (3GPP), a Long Term Evolution (LTE/4G), an LTE-Advanced (LTE-A), a Fifth Generation (5G) Core and New Radio (NR), General packet radio service (GPRS), Enhanced Data rates for GSM Evolution (EDGE), Universal Mobile Telecommunications System (UMTS), Enhanced Voice-Data Optimized (EVDO), High Speed Packet Access (HSPA), HSPA plus (HSPA+), or any other next generation network. The 3GPP network includes a Radio Access Network (RAN)/Base Station (BS) 208, and a core network 210.

The RAN/BS 208 referred herein may a node that connects the UE 206 to the associated CN 210. In an example the RAN/BS 208 may include at least one of, an eNodeB (eNB), gNodeB (gNB), or the like.

The CN 210 may be configured to connect the UE 206 (connected with the associated RAN/BS 208) to an external data network (not shown) for accessing 3GPP and 3rd party services. The CN 210 may include at least one of, an Evolved Packet Core (EPC), a 5G core network (5GC), or the like. Examples of the external data network may be, but are not limited to, the Internet, a Packet Data Network (PDN), an Internet Protocol (IP) Multimedia Core Network Subsystem, and so on. Examples of the 3GPP services may be, but are not limited to, a voice service session, a live streaming service session, a real time gaming service session, a buffered streaming service session, a Transport Control Protocol (TCP) based session (for example, an email, a messaging service, a file transferring service, and so on), an Internet Protocol (IP) Multimedia Subsystem (IMS) service, and so on.

The CN 210 includes an authentication server 212, a Unified Data Management (UDM) 214, a functional entity 216, and an interworking function (IWF) 218.

The authentication server 212 may be within a home network of the UE 206. The authentication server 212 may be configured to perform an authentication of the UE. In an example, the authentication server 212 referred herein may include one of, an Authentication Server Function (AUSF), an Authentication, Authorization, and Accounting (AAA) Server (AAA-S), an AAA Proxy server (AAA-P), or the like. Embodiments herein use the terms "authentication server", "AUSF", "AAA", "AAA-S", "AAA-P", and so on, interchangeably through the document.

The UDM 214 may be configured to host functions related to data management such as, an Authentication Credential Repository and Processing Function (ARPF), a Subscription Identifier De-concealing Function (SIDF), or the like. The UDM 214 using the ARPF selects an authentication method based on a subscriber identity, a purpose (i.e., an authentication is for 3GPP access or non-3GPP offloading), configured policy for the UE 206, or the like and computes authentication data and keys for the authentication server 212, when the authentication server 212 wants to authenticate the UE 206. The UDM 214 using the SIDF decrypts a Subscription Concealed Identifier (SUCI) of the UE 206 to obtain a Subscription Permanent Identifier (SUPI).

The functional entity 216 may include at least one of, an Access and Mobility Management Function (AMF) 216, a Security Anchor Function (SEAF) 216, or the like, if the CN 210 is the 5GC. The AMF 216 receives all connection and session related information from the UE 206 and handles connection and mobility management tasks. The SEAF 216 accepts/rejects the authentication of the UE. Embodiments herein use the terms "functional entity", "AMF", "SEAF", and so on, interchangeably through the document.

The IWF 218 may be deployed between the authentication server 212 and a non-3GPP network Access Point (AP) 220 of the non-3GPP network 204. In an example, the IWF 218 may include at least one of, but is not limited to, a Non-3GPP Interworking Function (N3IWF), a AAA-proxy (AAA-P), a relay authenticator, or the like. The IWF 218 may be configured for isolating the authentication server 212 from a direct access by the non-3GPP network 204 and for interworking between the non-3GPP network AP 220 and the authentication server 212 based on a Diameter/Radius protocol and a service-based interface. The terms "Interworking Function", "IWF", "N3IWF" and "Non-Seamless WLAN Offload (NSWO) Network Function (NF) (NSWO NF)", and so on, are used interchangeably throughout the document and refers to a Network Function in between the WLAN AP and other Core Network Function for exchange of messages between different interfaces and to indicate the authentication procedure is for non-3GPP network access authentication.

The non-3GPP network 204 referred herein may include at least one of, a Wireless Local Area Network (WLAN), Worldwide Interoperability for Microwave Access (WiMAX/IEEE 802.16), Wi-Fi (IEEE 802.11), or any other next generation network, and so on. The non-3GPP network 204 includes the non-3GPP AP 220, which provides non-3GPP services such as, communications over "public" access points, enterprise access points, or the like. In an embodiment, the non-3GPP network AP 220 may include a WLAN AP, if the non-3GPP network is the WLAN network. In an example, the non-3GPP network AP 220 is a trusted AP. In another example, the non-3GPP network AP 220 is an untrusted AP.

The non-3GPP network AP 220 may communicate with the authentication server 212 or components of the CN 210 through the IWF 218. The non-3GPP network AP 220 may connect to the IWF 218 through an Y2 interface. The non-3GPP network AP 220 and the IWF 218 support a SWm interface for carrying Extensible Authentication Protocol (EAP) messages. Also, the non-3GPP network AP 220 and the IWF 218 support a lower layer protocol, which carries the EAP messages. In an example, the lower layer protocol may include at least one of, a Protocol for Carrying Authentication for Network Access (PANA) protocol, a Diameter/Radius protocol, an EAP over Internet Protocol (IP), and so on.

The UE 206 may be a user device capable of accessing the non-3GPP services provided from the non-3GPP network 204. Examples of the UE 206 may be, but are not limited to, a mobile phone, a smartphone, a tablet, a phablet, a personal digital assistant (PDA), a laptop, a computer, a wearable computing device, a vehicle infotainment device, an IoT device, a Wireless Fidelity (Wi-Fi) router, a USB dongle, or any other device capable of accessing the 3GPP services and the non-3GPP services. Alternatively, the UE 206 may also be capable of accessing the 3GPP services from the 3GPP network 202 in conjunction with accessing the non-3GPP services from the non-3GPP network 204.

Embodiments herein disclose authentication of the UE 206 using a 3GPP subscription credential for accessing the non-3GPP services from the non-3GPP network 204. The authentication of the UE 206 may be performed prior to allocation of an IP address. In an embodiment, authenticating the UE 206 for accessing the non-3GPP network 204 prior to allocation of the IP address may be referred to performing an authentication and association procedure (for example, 802.1x authentication procedure, 802.11i security procedure, like so) between the UE 206 and the non-3GPP network AP 220 of the non-3GPP network 204 network to complete a non-3GPP network attachment/association procedure, then after successful authentication and association procedure, the IP address is allocated to the UE 206 (supplicant).

For accessing the non-3GPP services from the non-3GPP network 204, the UE 206 establishes a connection with the non-3GPP network AP 220 of the non-3GPP network 206. The UE 206 establishes the connection with the non-3GPP network AP 220 using a non-3GPP related technology specific procedure. For example, the UE 206 may establish the connection with a WLAN AP, an example of the non-3GPP network AP 220 using a Wireless LAN technology specific procedure. In an example, the Wireless LAN technology specific procedure may include a WLAN association procedure with open system authentication.

Once the UE 206 establishes the connection with the non-3GPP network AP 220, the non-3GPP network AP 220 sends an identity request to the UE 206. In an embodiment, the identity request includes an Extensible Authentication Protocol (EAP) identity request message. Embodiments herein use the terms "identity request", "EAP request", "EAP request-identity message", "EAP identity request message", and so on, interchangeably through the document.

In response to the sent identity request, the non-3GPP network AP 220 receives an identity response from the UE 206. In an embodiment, the non-3GPP network AP 220 receives the identity response of the UE 206 in a Network Access Identifier (NAI) format. The identity response of the UE 206 indicates an identity/subscriber identity of the UE 206 in the NAI format. The identity of the UE 206 may be the 3GPP subscription credential. In an embodiment, the identity of the UE 206 includes at least one of, but is not limited to, a Globally Unique Temporary Identifier (GUTI), a Subscription Concealed Identifier (SUCI), or Subscription Permanent Identifier (SUPI), or the like. Embodiments herein use the terms such as "identity response", "identity message", "EAP response-identity message", "EAP data", "EAP response", "subscriber identity", and so on, interchangeably through the document.

On receiving the identity response from the UE 206, the non-3GPP network AP 220 routes the identity response to the IWF 218 for an authentication of the UE 206 to access the non-3GPP services. For routing the identity response to the IWF 218, the non-3GPP network AP 220 identifies the suitable IWF 218 based on a realm part of the identity response received from the UE 206 in the NAI format. The non-3GPP network AP 220 routes the identity response of the UE 206 to the identified IWF 218 over the Diameter/Radius protocol.

On receiving the identity response of the UE 206, the IWF 218 sends the authentication request to the authentication server 212 using a service-based interface for the authentication of the UE 206. In an embodiment, the authentication request includes the identity response of the UE 206 and an indicator. The indicator may be used to determine whether the authentication request is for a normal network access authentication or a special case of authentication. In an example, the normal network access authentication indicates a 3GPP network access authentication, and the special case of authentication indicates the non-3GPP network access authentication. In an embodiment, the indicator depicts whether the key handling is to be considered as the normal network access authentication or not to store generated keys in a UE context (for example, in the special case of authentication). The key handling may be referred to storage of keys resulting from the authentication in network functions (for example, the authentication server 212 (the AUSF)/the AMF 216)). The generated keys may be keys used for the non-3GPP network access authentication. In another embodiment, the indication depicts whether the key handling and/or an authentication information handling to be considered as the normal network access authentication or as the special case of authentication, wherein the special case of authentication. Embodiments herein use the terms such as "WLAN-Auth", "Auth_Ind", and so on, interchangeably through the document. The authentication information handling refers to storage of information related to the authentication of the UE 206 such as, but are not limited to, a result of the authentication of the UE 206, details of the authentication server 212, or the like, in the UDM 214. During the normal network access authentication, the UDM 214 stores the keys and the information related to the authentication. During the special case of authentication, the UDM 214 does not store the keys and the information related to the authentication of the UE 206 (hereinafter referred as authentication related information).

On receiving the authentication request, the authentication server 212 determines that the authentication request is for the non-3GPP network access authentication. In an embodiment herein, the authentication server 212 determines the authentication request is for the non-3GPP network access authentication based on the indicator included in the authentication request received from the IWF 218.

On determining that the authentication request is for the non-3GPP network access authentication, the authentication server 212 retrieves an authentication vector (AV) from the UDM 214 for the non-3GPP network access authentication.

For retrieving the AV from the UDM 214, the authentication server 212 sends an authentication get request to the UDM 214 for the AV. In an embodiment, the authentication get request may include the indicator depicting whether the authentication get request is for the 3GPP network access authentication or the non-3GPP network access authentication. On receiving the authentication get request from the authentication server 212, the UDM 214 determines that the authentication get request is for the non-3GPP network access authentication based on the indicator included in the authentication get request received from the authentication server 212. The UDM 214 deconceals the SUCI of the UE 206 to obtain the SUPI. The UDM 214 generates the AV based on the obtained SUPI. In an embodiment, the AV includes an Extensible Authentication Protocol Method for 3rd Generation Authentication and Key Agreement (EAP-AKA') based AV. The UDM 214 sends the AV to the authentication server 212 in an authentication get response message.

On retrieving the AV from the UDM 214, the authentication server 212 initiates the authentication with the UE 206 using the AV retrieved from the UDM 214. The authentication server 212 verifies whether the authentication initiated with the UE 206 is successful. For verifying whether the authentication initiated with the UE 206 is successful, the authentication server 212 receives a response value from the UE 206. The UE 206 generates the response value as specified in the 3GPP technical specification TS 33.501. The authentication server 212 matches the received response value of the UE 206 with a stored expected response value. The authentication server 212 verifies that the authentication initiated with the UE 206 is successful, if the received response value from the UE 206 matches with the stored expected response value.

On verifying that the authentication initiated with the UE 206 is successful, the authentication server 212 generates a Master Session Key (MSK) specific to the non-3GPP network access authentication. The authentication server 212 generates the MSK using the AV retrieved from the UDM for the non-3GPP network access authentication. In an embodiment, the MSK may be independent of an established current Non-Access Stratum (NAS) security context, or a key derived at the authentication server 212 (for example, a key KAUSF).

On generating the MSK, the authentication server sends a success message with the generated MSK to the non-3GPP network access AP through the IWF 218 for allocating the IP address to the UE 206 to access the non-3GPP services. The success message indicates that the authentication of the UE 206 is successful.

Thus, authenticating and authorizing the UE 206 before allocating the IP address prevents a fraudulent UE from accessing the non-3GPP services from the non-3GPP network AP 220.

FIG. 2 shows exemplary blocks of the communication system 200, but it is to be understood that other embodiments are not limited thereon. In other embodiments, the communication system 200 may include less or more number of blocks. Further, the labels or names of the blocks are used only for illustrative purpose and does not limit the scope of the embodiments herein. One or more blocks can be combined together to perform same or substantially similar function in the communication system 200.

Figure 3:
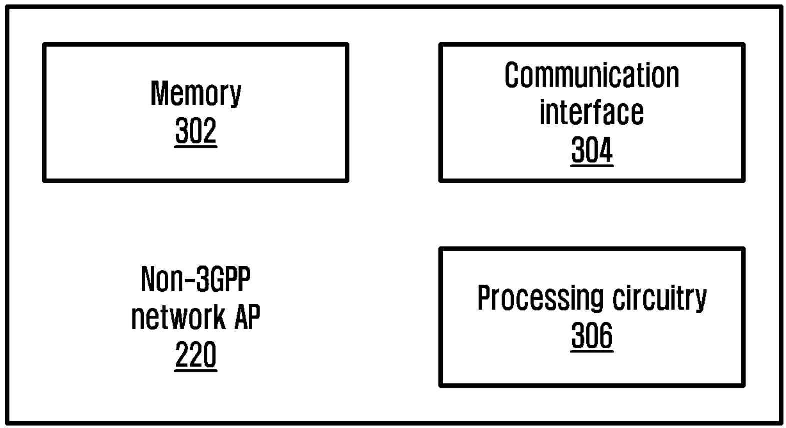
FIG. 3 is an example block diagram depicting components of a non-3GPP network Access Point (AP) for providing non-3GPP services to a UE based on successful authentication of a UE, according to embodiments as disclosed herein.

FIG. 3 is an example block diagram depicting components of the non-3GPP network AP 220 for providing the non-3GPP services to the UE 206 based on the successful authentication of the UE 206, according to embodiments as disclosed herein. The non-3GPP network AP 220 includes a memory 302, a communication interface 304, and a processing circuitry 306.

The memory 302 may store at least one of, the identity response of the UE 206, the AV, and so on. Examples of the memory 302 may be, but are not limited to, NAND, embedded Multimedia Card (eMMC), Secure Digital (SD) cards, Universal Serial Bus (USB), Serial Advanced Technology Attachment (SATA), solid-state drive (SSD), and so on. Further, the memory 302 may include one or more computer-readable storage media. The memory 302 may include one or more non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 302 may, in some examples, be considered a non-transitory storage medium. The term "non-transitory" may indicate that the storage medium is not embodied in a carrier wave or a propagated signal. However, the term "non-transitory" should not be interpreted to mean that the memory is non-movable. In certain examples, a non-transitory storage medium may store data that can, over time, change (e.g., in Random Access Memory (RAM) or cache).

The communication interface 304 may be configured to enable the non-3GPP network AP 220 to communicate with the UE 206, the CN 210, the components of the CN 210, or the like via an interface supported by the non-3GPP network. Examples of the interface may be at least one of, but is not limited to, a wired or wireless fronthaul interface, a wired or wireless backhaul interface, or any structure supporting communications over a wired or wireless connection. The communication interface 304 may be configured to enable the non-3GPP network AP 220 to communicate with the authentication server 212 through the IWF 218.

The processing circuitry 306 includes at least of, a single processer, a plurality of processors, multiple homogeneous or heterogeneous cores, multiple Central Processing Units (CPUs) of different kinds, microcontrollers, special media, and other accelerators. The processing circuitry 306 may be configured to provide the non-3GPP services to the UE 206, when the UE 206 has been successful authenticated by the authentication server 212 using the 3GPP subscription credential.

The processing circuitry 306 sends the identity request to the UE 206, when the UE 206 successfully establishes the connection with the non-3GPP network AP 220. In response to the sent identity request, the processing circuitry 306 receives the identity response of the UE 206 in the NAI format. The processing circuitry 306 identifies the suitable IWF 218 based on the realm part of the identity response received from the UE 206 in the NAI format. The processing circuitry 306 sends the identity response of the UE 206 to the identified IWF 218 over the Diameter/Radius protocol, wherein the IWF 218 sends the authentication request to the authentication server 212 for authenticating the UE 206 based on the identity response of the UE 206.

The processing circuitry 306 receives the success message and the MSK from the authentication server 212 through the IWF 218, when the UE 206 has been authenticated successfully by the authentication server 212. Once the UE 206 has been authenticated successfully, the processing circuitry 306 allocates the IP address to the UE 206. Once the IP address has been allocated, the UE 206 performs a tunnel establishment procedure with the IWF 218 using the key derived during the previous authentication for accessing the non-3GPP services.

FIG. 3 shows exemplary blocks of the non-3GPP network AP 220, but it is to be understood that other embodiments are not limited thereon. In other embodiments, the non-3GPP network AP 220 may include less or more number of blocks. Further, the labels or names of the blocks are used only for illustrative purpose and does not limit the scope of the embodiments herein. One or more blocks can be combined together to perform same or substantially similar function in the non-3GPP network AP 220.

Figure 4:
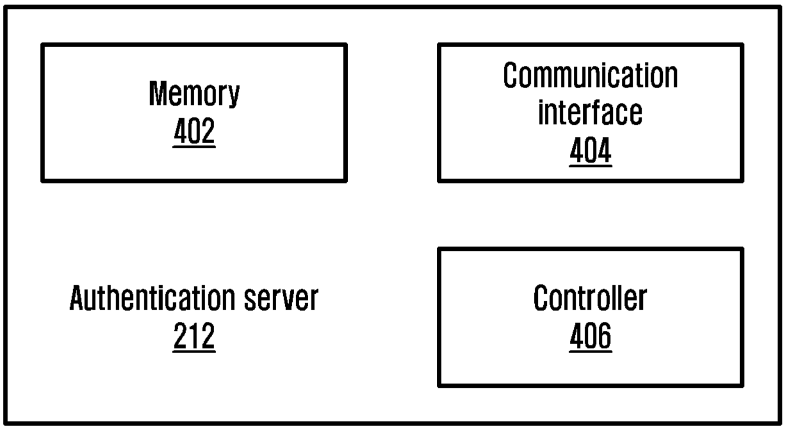
FIG. 4 is an example block diagram depicting components of the authentication server for authenticating the UE to access the non-3GPP services from the non-3GPP network, according to embodiments as disclosed herein.

FIG. 4 is an example block diagram depicting components of the authentication server 212 for authenticating the UE 206 to access the non-3GPP services from the non-3GPP network 204, according to embodiments as disclosed herein. The authentication server 212 includes a memory 402, a communication interface 404, and a controller 406.

The memory 402 may store at least one of, the identity response of the UE 206, the AV, the response value of the UE 206, the expected response value, the MSK or the keys generated for the authentication of the UE 206, and so on. Examples of the memory 402 may be, but are not limited to, NAND, embedded Multimedia Card (eMMC), Secure Digital (SD) cards, Universal Serial Bus (USB), Serial Advanced Technology Attachment (SATA), solid-state drive (SSD), and so on. Further, the memory 402 may include one or more computer-readable storage media. The memory 402 may include one or more non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 402 may, in some examples, be considered a non-transitory storage medium. The term "non-transitory" may indicate that the storage medium is not embodied in a carrier wave or a propagated signal. However, the term "non-transitory" should not be interpreted to mean that the memory is non-movable. In certain examples, a non-transitory storage medium may store data that can, over time, change (e.g., in Random Access Memory (RAM) or cache).

The communication interface 404 may be configured to enable the authentication server 212 to communicate with the non-3GPP network AP 220 through the IWF 218. The communication interface 404 may also be configured to enable the authentication server 212 to communicate with other components of the CN 210 via an interface supported by the associated 3GPP network 202. Examples of the interface may be at least one of, but is not limited to, a wired or wireless fronthaul interface, a wired or wireless backhaul interface, or any structure supporting communications over a wired or wireless connection.

The controller 406 includes at least of, a single processer, a plurality of processors, multiple homogeneous or heterogeneous cores, multiple Central Processing Units (CPUs) of different kinds, microcontrollers, special media, and other accelerators.

The controller 406 may be configured to authenticate the UE 206 using the 3GPP subscription credential for accessing the 3GPP services from the non-3GPP network 204. For authenticating the UE 206, the controller 406 receives the authentication request from the IWF 218 for the authentication of the UE 206, when the IWF 218 receives the identity response of the UE 206 from the non-3GPP network AP 220. The authentication request includes the identity response of the UE 206 and the indicator.

On receiving the authentication request from the IWF 218, the controller 406 determines that the authentication request is for the non-3GPP network access authentication based on the indicator included in the authentication request received from the IWF 218. The controller 406 retrieves the AV from the UDM 214 for the non-3GPP network access authentication. On retrieving the AV from the UDM 214, the controller 406 initiates the authentication with the UE 206 and verifies whether the authentication initiated with the UE 206 is successful. For verifying the authentication initiated with the UE 206 is successful, the controller 406 receives the response value of the UE 206 from the non-3GPP network AP 220 through the IWF 218. The controller 406 matches the received response value of the UE 206 with the stored expected response value. The controller 406 verifies that the authentication with the UE 206 is successful, when the response value of the UE 206 matches with the stored expected response value.

On verifying that the authentication with the UE 206 is successful, the controller 406 generates the MSK using the AV for the non-3GPP network access authentication. The controller 406 sends the success message with the MSK to the non-3GPP network AP 220 through the IWF 218 for allocating the IP address to the UE 206 for accessing the non-3GPP services.

FIG. 4 shows exemplary blocks of the authentication server 212, but it is to be understood that other embodiments are not limited thereon. In other embodiments, the authentication server 212 may include less or more number of blocks. Further, the labels or names of the blocks are used only for illustrative purpose and does not limit the scope of the embodiments herein. One or more blocks can be combined together to perform same or substantially similar function in the authentication server 212.

Embodiments herein further describe the authentication of the UE 206 by considering that the communication system 200 is a 5G-WLAN interworking system 200, as an example, but it is obvious to a person skilled in the art that any other 3GPP network-non-3GPP network interworking system. In the 5G-WLAN interworking system 200, the 3GPP network 202 includes a 5G network 202, and the non-3GPP network 204 includes a WLAN 204. The 5G network 202 includes a gNB 208, and a 5GC/5GC network 210. The 5GC 210 includes the authentication server 212 as an AUSF/AAA-S 212, the functional entity 216 as an AMF/SEAF 216, and the IWF 218 as a N3IWF 218. The WLAN 204 includes a WLAN AP 220. The non-3GPP network access authentication in the 5G-WLAN interworking system 200 may be referred as a WLAN access authentication.

Figure 5:
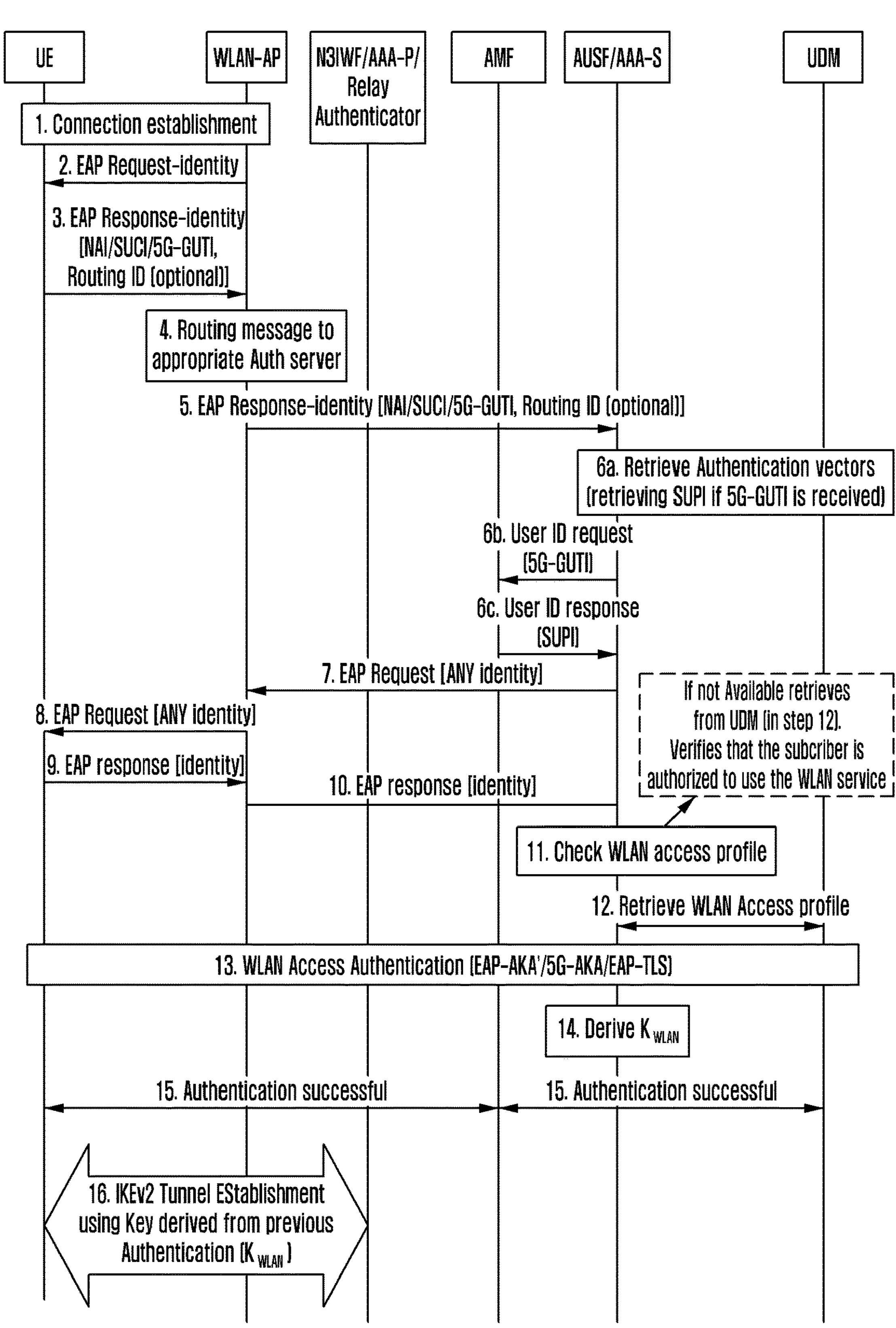
FIG. 5 is an example sequence diagram depicting the authentication of the UE for accessing the WLAN AP prior to allocation of any Internet Protocol (IP) address, according to embodiments as disclosed herein.

FIG. 5 is an example sequence diagram depicting the authentication of the UE 206 for accessing the WLAN AP 220 prior to allocation of any IP address, according to embodiments as disclosed herein.

At step 1, the UE 206 establishes the connection with the WLAN AP 220 using the Wireless LAN technology specific procedure. In an example, the Wireless LAN technology procedure may include the WLAN association procedure with open system authentication. Once the connection is established between the UE 206 and the WLAN AP 220, the WLAN AP 220 sends the identity request (i.e., the EAP request) to the UE 206. The EAP request includes EAP packets that have been encapsulated within a Wireless LAN technology specific protocol and transported over a Wireless LAN interface (for example, into IEEE 802.3/802.1x packets, into IEEE 802.11/802.1x packets, or the like).

At step 3, the UE 206 sends the identity response/identity message/EAP response to the WLAN AP 220. In an example, the UE 206 sends the EAP response to the WLAN AP 220 complying with the NAI format or a 5G-GUTI format, as specified in the 3GPP TS 23.003. In another example, in the case of a first authentication, the UE 206 sends the SUCI in the EAP response. In another example, the UE 206 sends the routing identifier in the EAP response. In an embodiment, the UE 206 may always send the SUCI to the WLAN AP 220, when the UE 206 is about to perform the WLAN access authentication (even though a valid 5G-GUTI is available, as the AMF 216 is not involved or to avoid a new procedure of retrieval of the SUPI from the 5G-GUTI).

At step 4, the WLAN AP 220 routes the EAP response/identity response of the UE 206 towards the designated AUSF/AAA-S 212 based on the realm part of the NAI and/or the identifier. In an embodiment, it may be optional for the UE 206 to provide the routing identifier, if the NAI has been already sent by the UE 206 to the WLAN AP 220. In an embodiment, the WLAN AP 220 discovers the designated AUSF/AAA-S 212 for the WLAN access authentication before allocating the IP address. The WLAN AP 220 discovers the N3IWF 218 for a 5GC registration procedure.

In an embodiment, the WLAN AP 220 routes the EAP response of the UE 206 to the designated AUSF/AAA-S 212 through the N3IWF 218 selected by the UE 206 in a Public Land Mobile Network (PLMN). In such a case, the N3IWF 218 acts as the AAA-P or the relay authenticator. When the WLAN AP 220 routes the EAP response of the UE 206 to the designated AUSF/AAA-S 212 through the N3IWF 218, the EAP response is first encapsulated in Extensible Authentication Protocol (EAP) over LAN (EAPOL) frames between the UE 206 and the WLAN AP 220, and then re-encapsulated between the N3IWF 218 and the WLAN AP 220 using the Diameter/Radius protocol. In such a scenario, the AUSF/AAA-S includes a Diameter/Radius client/server function to communicate with the N3IWF 218 over the Diameter/Radius protocol. In an embodiment, there may be a direct interface between the N3IWF 218 and the AUSF/AAA-S 212. In another embodiment, the AMF 216 may act as a proxy or a relay and forward messages between the N3IWF 218 and the AUSF/AAA-S 212.

At step 5, the AUSF/AAA-S 212 receives the EAP response/identity message/identity packet that contains the subscriber identity of the UE 206. The EAP response may also include an identifier of the WLAN network 204/WLAN AP identifier, a Visitor PLMN and a Medium Access Control (MAC) address of the UE 206. The WLAN AP identifier corresponds to Wireless Access Point Name (W-APN) of the WLAN AP.

At step **6*a*, the AUSF/AAA-S 212 identifies the UE 206/subscriber based on the subscriber identity of the UE 206 received in the EAP response. On identifying the UE 206, the AUSF/AAA-S 212 checks if the AUSF/AAA-S 212 has an unused AV for the UE 206. If the AUSF/AAA-S 212 does not have the unused AV for the UE 206, the AUSF/AAA-S 212 retrieves a set of new AVs from the UDM 214. The AUSF/AAA-S 212 may receive a mapping from a temporary identifier to the SUPI as the AV from the UDM 214, if the received EAP response of the UE 206** includes the 5G-GUTI.

In an embodiment, as depicted at steps **6*b*, and 6*c*, the AUSF/AAA-S 212 contacts the AMF 216 using the 5G-GUTI (may be any service based message) and retrieves the SUPI, if the received EAP response of the UE 206** includes the 5G-GUTI.

In another embodiment, if the AUSF/AAA-S 212 requires only the SUPI (not the 5G-GUTI), the steps 7, 8, 9, and 10 (optional steps).

At the step 7, the AUSF/AAA-S 212 sends an EAP request-identity message to the WLAN AP 220 through the N3IWF requesting again for the identity response of the UE 206. The EAP request-identity message may be an identity request sent again by the AUSF/AAA-S 212 to the WLAN AP 220, since intermediate nodes in the communication system 200 may have changed or replaced the identity of the UE 206 received in the EAP response.

At step 8, the WLAN AP 220 forwards the EAP request-identity message to the UE 206. At step 9, the UE 206 responds for the EAP request-identity message by sending the identity to the WLAN AP 220 in an EAP response-identity message.

At step 10, the WLAN AP 220 forwards the EAP response-identity message to the AUSF/AAA-S 212 through the N3IWF 218. The identity of the UE 206 received in the EAP response-identity message may be used by the AUSF/AAA-S 212 in the rest of the authentication of the UE 206. If the AUSF/AAA-S 212 identifies any inconsistencies between the subscriber identity of the UE 206 received in the first EAP response (at step **6*a*) and the subscriber identity of the UE 206 received in the EAP response-identity message (at step 10), the AUSF/AAA-S 212 identifies that a user profile and the AV previously retrieved from the UDM 214 corresponding to the first EAP response are not valid. In such a scenario, the AUSF/AAA-S 212 again retrieves the AV from the UDM 214 corresponding to the subscriber identity of the UE 206 received in the EAP response-identity message (at step 10) (i.e., performing the step 6*a* before continuing with the step 11). If the AUSF/AAA-S 212 identifies consistency between the subscriber identity of the UE 206 received in the first EAP response (at step 6*a*) and the subscriber identity of the UE 206 received in the EAP response-identity message (at step 10), the AUSF/AAA-S 212 uses the AV that has already been retrieved from the UDM 214**.

At steps 11, and 12, the AUSF/AAA-S 212 checks if the AUSF/AAA-S 212 has a WLAN access profile available for the UE 206/subscriber. If the AUSF/AAA-S 212 does not have the WLAN access profile, the AUSF/AAA-S 212 retrieves the WLAN access profile from the UDM 214. On retrieving the WLAN access profile, the AUSF/AAA-S 212 verifies that the UE 206/subscriber is authorized to use the WLAN access profile/corresponding WLAN service. In an embodiment, the UDM 214 may perform an authorization check to verify that the UE 206/subscriber is authorized to use the WLAN access profile/corresponding WLAN service.

At step 13, the WLAN access authentication (i.e., the non-3GPP network access authentication) is performed between the UE 206 and the 5GC 210 including the AUSF/AAA-S 212.

At step 14, the AUSF or AAA-S 212 derives the MSK/EMSK using the AV, and WLAN access keys using the MSK/EMSK and other parameters. The derivation of the WLAN access keys is described in detail in conjunction with FIG. 11.

At step 15, after the successful authentication of the UE 206, the AUSF/AAA-S 212 sends the success message, the MSK/EMSK, and/or the WLAN access keys to the WLAN AP 220. The WLAN AP 220 forwards the success message, the MSK/EMSK, and/or the WLAN access keys to the UE 206. Thus, allocating the IP address for the UE 206. On allocating the IP address, at step 16, the UE 206 initiates a procedure for the tunnel establishment. In an embodiment, the UE 206 may initiate the procedure for the tunnel establishment with the N3IWF 218 along with the 5GC registration procedure.

The UE 206 derives a new keying material from an IK and a CK, as specified in the 3GPP TS 33.501. The new keying material may be required by the EAP-AKA'/5G-AKA authentication. The UE 206 may also generate an additional keying material for WLAN technology specific confidentiality and/or integrity protection.

In an embodiment, the UE 206 may derive the tunnel session key (KWLAN/KN3A) using the EMSK/MSK derived during the previous authentication (i.e., at step 13). The UE 206 may use the tunnel session key for performing the tunnel establishment with the N3IWF 218 for accessing the non-3GPP services. In an embodiment, the UE 206 may perform the tunnel establishment procedures as embodied in the 3GPP TS 33.234 and other related specifications for the tunnel establishment with the N3IWF 218.

The authentication of the UE 206/authentication process may fail at any of the steps 1-13. For example, the authentication process may fail due to unsuccessful checking of MACs or no response from the UE 206 after a network request (i.e., the EAP request-identity message), or the like. In such a case, an EAP AKA process may be terminated, and an indication may be sent to the UDM 214.

In an embodiment, the UE 206 and the WLAN AP 220 may use an EAPOL method to exchange identities between each other. In an example, an Internet key exchange version two (IKEv2) mutual authentication may be used to dynamically establish IP Security Protocol (IPsec), which mandates a mutual authentication between the UE 206 and the WLAN AP 220. For the IKEv2 mutual authentication in the 5G-WLAN interworking system 200, the N3IWF uses a public key certificate to authenticate the UE 206, while the UE 206 uses the EAP-AKA' to authenticate to the N3IWF 218.

FIG. 6 is an example sequence diagram depicting a process of performing the authentication between the UE 206 and the AAA-S/AUSF/UDM when accessing "WLAN 3GPP IP Access" services (i.e., the non-3GPP services) after the WLAN access authentication (i.e., the non-3GPP network access authentication), according to embodiments as disclosed herein.

At step 1, the UE 206 establishes the connection with the WLAN AP 220. At step 2, the WLAN AP 220 sends the EAP request-identity message to the UE 206. At step 3, the UE 206 sends the EAP response-identity message to the WLAN AP 220. The EAP response-identity message includes the WLAN AP identifier (W-APN), the identity of the UE 206, a user MAC address, a vendor identifier (ID), or the like to intimate that a 3GPP IP access is performed consecutively.

At step 4, the WLAN AP 220 relays the EAP response-identity message to the authentication server (AAA-S/AUSF/UDM). The EAP response-identity message may be encapsulated first in the EAPOL frames between the UE 206 and the WLAN AP 220, and then re-encapsulated between the WLAN-AP and the AAA-S/AUSF/UDM using the Diameter/Radius protocol.

On receiving the EAP response-identity message, at step 5, the AAA-S/AUSF/UDM sends a notify request to the WLAN AP 220. The notify request includes an indication of a method to be used for the authentication and an indication depicting whether the WLAN 3GPP IP access authentication is performed consecutively.

At step 6, the WLAN AP 220 relays the EAP request message to the UE, wherein the EAP request message includes the notify request received from the AAA-S/AUSF/UDM. At step 7, the UE 206 sends the EAP response message to the WLAN AP 220, wherein the EAP response message includes an acknowledgement. At step 8, the WLAN AP 220 relays the EAP response message of the UE 206 to the AAA-S/AUSF/UDM.

At steps 9-11, the AAA-S/AUSF/UDM initiates the EAP-AKA'/5G-AKA/EAP-Transport Layer Security (TLS) procedure and authenticates the UE 206 for accessing the WLAN AP 220. After authenticating the UE 206, at step 12, the AAA-S/AUSF derives the KWLAN and stores the KWLAN. At step 13, the UE 206 initiates the tunnel establishment procedure.

Figure 7:
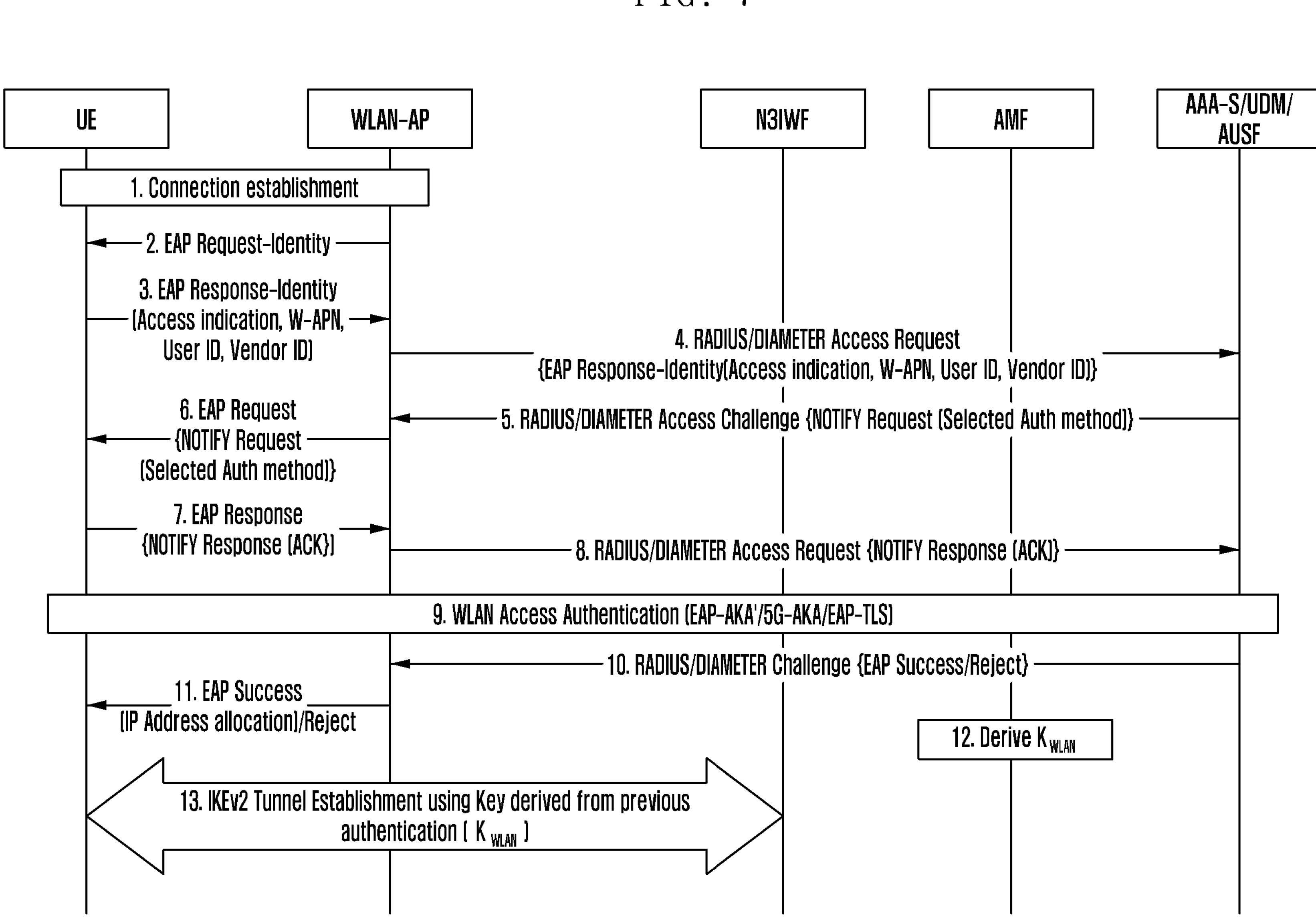
FIG. 7 is an example sequence diagram depicting the authentication between the UE and the AAA-S/AUSF/UDM when accessing the "WLAN 3GPP IP Access Services" after the WLAN access authentication by which an Access and Mobility Management Function (AMF) derives a key KWLAN, according to embodiments as disclosed herein.

FIG. 7 is an example sequence diagram depicting the authentication between the UE 206 and the AAA-S/AUSF/UDM when accessing the "WLAN 3GPP IP Access Services" after the WLAN access authentication by which the AMF 216 derives the key KWLAN, according to embodiments as disclosed herein. In an embodiment, the AMF 216 delivers the key KWLAN to the N3IWF 218. The AMF 216 derives the key KWLAN from a key KAMF. The key KWLAN may be then used by the UE 206 and the N3IWF 218 to complete the authentication within the IKEv2.

At step 1, the UE 206 establishes the connection with the WLAN AP 220. At step 2, the WLAN AP 220 sends the EAP request-identity message to the UE 206. At step 3, the UE 206 sends the EAP response-identity message to the WLAN AP 220. The EAP response-identity message includes the WLAN AP identifier (W-APN), the identity of the UE 206, a user MAC address, a vendor identifier (ID), or the like to intimate that the 3GPP IP access is performed consecutively.

At step 4, the WLAN AP 220 relays the EAP response-identity message to the authentication server (AAA-S/AUSF/UDM). The EAP response-identity message may be first encapsulated in the EAPOL frames between the UE 206 and the WLAN AP 220, and then re-encapsulated between the WLAN-AP and the AAA-S/AUSF/UDM using the Diameter/Radius protocol.

On receiving the EAP response-identity message, at step 5, the AAA-S/AUSF/UDM sends the notify request to the WLAN AP 220. The notify request includes the indication of the method to be used for the authentication and the indication depicting whether the WLAN 3GPP IP access authentication is performed consecutively.

At step 6, the WLAN AP 220 relays the EAP request message to the UE 206, wherein the EAP request message includes the notify request received from the AAA-S/AUSF/UDM. At step 7, the UE 206 sends the EAP response message to the WLAN AP 220, wherein the EAP response message includes the acknowledgement. At step 8, the WLAN AP 220 relays the EAP response message of the UE 206 to the AAA-S/AUSF/UDM.

At steps 9-11, the AAA-S/AUSF/UDM initiates the EAP-AKA'/5G-AKA/EAP-TLS procedure and authenticates the UE 206 for accessing the WLAN AP 220. After authenticating the UE 206, at step 12, the AMF 216 derives the key KWLAN and stores the key KWLAN. At step 13, the UE 206 initiates the tunnel establishment procedure.

FIG. 8 is an example sequence diagram depicting the generation of optimized IKEv2 mutual authentication keys for the tunnel establishment procedure over the 5G-WLAN interworking system using the EMSK derived during the WLAN access authentication procedure for a tunnel establishment request, according to embodiments as disclosed herein.

At step 1, a pre-authentication may be performed between the UE 206 and the AAA-S 212 for accessing the WLAN AP 220. At step 2, the UE 206 sends an IKE_SA_INIT request to the N3IWF 218, as specified in Internet Engineering Task Force (IETF) Request for Comments (RFC) 7296. At step 3, the N3IWF 218 sends an IKE_SA_INIT response to the UE 206 in response to the received IKE_SA_INIT request IETF RFC 7296.

At step 4, the UE 206 derives the key KWLAN directly and calculates an authentication parameter AUTH as specified in IETF RFC 7296 using the derived key KWLAN. At step 5, the UE 206 sends the IKE_AUTH request to the N3IWF 218. The IKE_AUTH request as specified in IETF RFC 7296 includes at least one of, an Idi, a Certificate Request (CERT REQ), a SAi, the authentication parameter (AUTH), a Traffic Selector-initiator (TSi), and Traffic Selector-responder (TSr). At step 6, the N3IWF 218 sends an access request to the AAA-S 212, wherein the access request includes the user ID, the W-APN.

At step 7, the AAA-S 212 derives the key KWLAN, if the UE 206 has been already authenticated for accessing the WLAN AP 220. At step 8, the AAA-S 212 sends an access accept (i.e., the key KWLAN) to the N3IWF 218. At step 9, the N3IWF 218 sends an IKE_AUTH response to the UE 206, wherein the IKE_AUTH response as specified in IETF RFC 7296 includes the mutual authentication keys such as, an IDr, a CERT, an AUTH, a SAr, a TSi, and a TSr.

FIG. 9 is an example sequence diagram depicting the authentication of the UE 206 using the AMF 216, wherein the N3IWF 218 selects the AMF 216 and the AMF/SEAF 216 derives the key for the WLAN radio interface protection from the key KAMF/KSEAF, according to embodiments as disclosed herein.

In an embodiment, at step 1, the UE 206 associates with the WLAN AP 220 and the EAP-AKA' authentication procedure may be initiated. At steps 2-4, the UE 206 provides the NAI or the SUCI to the WLAN AP 220. The UE 206 may construct the SUCI as specified in the clause 6.12.2 of the 3GPP TS 33.501, if a registration initiated by the UE 206 is an initial registration or the 5G-GUTI is included in the NAI. The 5GC registration procedure and the WLAN access authentication may be performed together, that means the NAS message is included as a part of the EAP response and the EAP response may be carried by a WLAN MAC protocol. The WLAN AP 220 selects the N3IWF 218 based on the realm part of the NAI received from the UE 206 and sends an AAA request to the selected N3IWF. In an embodiment, over an N2 interface, the EAP messages may be encapsulated within NAS authentication messages. The messages exchanged between the WLAN AP 220 and the N3IWF 218 may be encapsulated into layer-2 packets, for example, into IEEE 802.3/802.1x packets, into IEEE 802.11/802.1x packets, or the like. In an embodiment, the N3IWF acts as a Diameter proxy or a Diameter relay and forwards Diameter packets between the WLAN AP 220 and the AMF 216.

At steps 5-6, the N3IWF 218 selects the AMF 216 and initiates a 5GC Registration Request message including a registration type. The registration type indicates "Initial Registration" and sends a N2 message to the AMF 216. At step 7, if the SUCI is received by the AMF 216, the AMF 216 triggers an authentication procedure by sending a request to the AUSF 212, wherein the request includes a Nausf_UEAuthentication_Authenticate Request message. The Nausf_UEAuthentication_Authenticate Request message contains the SUCI of the UE 206. The AUSF 212 sends a Nudm_UEAuthentication_Get Request message to the UDM 214 by including the SUCI of the UE 206.

At step 8, the UDM 214 invokes the SIDF, if the SUCI is received. The SIDF deconceals the SUCI to obtain the SUPI before the UDM 214 may process the Nudm_UEAuthentication_Get Request message.

At step 9, the EAP-AKA'/5G-AKA procedure may be trigged to perform a mutual authentication between the UE 206 and the 5GC 210 as specified in clause 6.1.3.1 of the 3GPP specification.

At step 10, after authentication the UE 206 (for example, 802.1x using EAP-AKA/EAP-TLS), the AMF 216 derives the key KWLAN from the key KSEAF or the key KAMF and stores the key KWLAN. At steps 11-12, after successful authentication of the UE 206, the UE 206 initiates the tunnel establishment procedure (i.e., the UE 206 proceeds with the establishment of an IPsec Security Association (SA) with the selected N3IWF 218 by initiating an IKE initial exchange).

Thus, at steps 1-11, the UE 206 performs the 5GC registration procedure along with a WLAN specific authentication and association. The EAP messages may be encapsulated within NAS authentication messages. The messages exchanged between the WLAN AP 220 and the N3IWF 218 may be encapsulated into layer-2 packets, for example, into IEEE 802.3/802.1x packets, into IEEE 802.11/802.1x packets, EAPOL packets, or the like.

In an embodiment, at step 3, the UE 206 includes the 5GS registration type as "initial registration" in a registration request NAS message, when performing the 5GC registration procedure along with the WLAN specific authentication and association. Optionally, the UE 206 may also include an indication (for example, "WLAN-AUTH") in an EAPOL message. The indication included in the EAPOL message indicates that the 5GC registration procedure may be performed as part of the WLAN access authentication procedure. On receiving the indication in the EAPOL message, the WLAN AP 220 (an authenticator) includes the indication ("WLAN-AUTH") in a Diameter/Radius message and sends the Diameter/Radius message to the AMF 216. On receiving the indication ("WLAN-AUTH"), the AMF 216 forwards the indication to the AUSF 212. If the AUSF 212 receives the indication from the AMF 216, the AUSF 212 provides the MSK along with the key KSEAF to the AMF 216. If the AMF 216 receives the MSK along with the key KSEAF, the AMF 216 provides a key KN3IWF and sends the received MSK along with the key KN3IWF to the N3IWF 218. The N3IWF 218 then forwards the MSK to the WLAN AP 220. On receiving the MSK, the UE 206 and the WLAN AP 220 complete the WLAN access authentication procedure. Once the authentication is successful, the UE 206 proceeds with the establishment of the IPsec SA with the selected N3IWF 218 by initiating the IKE initial exchange (as depicted at step-12) as specified in TS 33.501 clause 7.2.

In another embodiment, at step 3, the UE 206 includes the 5GS registration type as "initial registration" in the registration request NAS message, when performing the 5GC registration procedure along with the WLAN specific authentication and association. Optionally, the UE 206 may also include the indication (for example, "WLAN-AUTH") in an NAS message. The indication included in the NAS message indicates that the 5G registration procedure may be performed as part of the WLAN access authentication procedure. On receiving the indication in the NAS message, the AMF 216 forwards the indication to the AUSF 212. If the AUSF 212 receives the indication from the AMF 216, the AUSF 212 provides the MSK along with the key KSEAF to the AMF 216. If the AMF 216 receives the MSK along with the KSEAF, the AMF 216 provides a key KN3IWF and sends the received MSK along with the KN3IWF to the N3IWF 218. The N3IWF 218 then forwards the MSK to the WLAN AP 220. On receiving the MSK, the UE 206 and the WLAN AP 220 complete the WLAN access authentication procedure. Once the authentication is successful, the UE 206 proceeds with the establishment of the IPsec SA with the selected N3IWF 218 by initiating the IKE initial exchange (as depicted at step-12) as specified in TS 33.501 clause 7.2.

In another embodiment, at step 3, the UE 206 includes the 5GS registration type as "initial registration" in the registration request NAS message, when performing the 5GC registration procedure along with the WLAN specific authentication and association. The registration type indicates that the 5GC registration procedure may be performed as part of the WLAN access authentication procedure and an existing NAS context, if any NAS context has to be untouched and/or if there is not NAS context, no new NAS context has to be created. On receiving the registration type, the AMF 216 forwards the registration type to the AUSF 212 and does not perform any NAS related procedures. If the AUSF 212 receives the registration type from the AMF 216, the AUSF 212 provides only the MSK to the AMF 216. If the AMF 216 receives only the MSK, the AMF 216 forwards the received MSK to the WLAN AP 220. On receiving the MSK, the UE 206 and the WLAN AP 220 complete the WLAN access authentication procedure. Once the authentication is successful, the UE 206 proceeds with the establishment of the IPsec SA with the selected N3IWF 218 by initiating the IKE initial exchange (as depicted at step-12) as specified in TS 33.501 clause 7.2.

In another embodiment, at step 3, the UE 206 includes the 5GS registration type as "initial registration" in the registration request NAS message, when performing the 5G registration procedure along with the WLAN specific authentication and association. At steps 10*a* and 10*b*, the UE 206 and the AMF 216 derive a key KN3IWF-1 as specified in the 3GPP TS 33.501 (i.e., KN3IWF key derivation). On deriving the key KN3IWF-1, the AMF 216 provides the key KN3IWF-1 to the N3IWF 218. The N3IWF 218 forwards the key KN3IWF-1 to the WLAN AP 220. The WLAN AP 220 and the UE 206 use the KN3IWF-1 as the MSK and complete the WLAN authentication/association procedure.

At step 12, the UE 206 proceeds with the establishment of the IPsec SA with the selected N3IWF 218 by initiating the IKE initial exchange, after successful completion of the 5GC Registration and the WLAN access authentication procedure. At step 12, the UE 206 includes the 5GS registration type as "mobility registration updating" or "periodic registration updating" or "IKEv2 procedure after WLAN-Auth" in the registration request NAS message and sends the registration type to the N3IWF 218. The N3IWF 218 forwards the registration request NAS message received from the UE 206 to the AMF 216 and optionally includes a request for the key KN3IWF. In an embodiment, the UE 206 includes an indication in the registration request NAS message (for example, an IKEv2 procedure after the "WLAN-AUTH"). On receiving the indication from the UE 206 and/or from the N3IWF 218, the AMF 216 generates and provides the new key KN3IWF to the N3IWF 218. Then the newly derived key KN3IWF-2 may be used as a Pre-Shared (PSK) key to perform a PSK based IKEv2 authentication.

FIG. 10 is an example sequence diagram depicting the authentication of the UE 206 by the AAA-P in case of roaming of the UE 206, according to embodiments as disclosed herein.

The authentication of the UE 206 described in FIG. 10 is similar to the authentication of the UE 206 described in FIG. 5 with an additional entity AAA-P. The AAA-P in a serving PLMN of the UE 206 may be used in case of roaming of the UE 206. In an embodiment, the AAA-P may be used as an interworking function between the serving PLMN and the home PLMN.

In an embodiment, an EAP-TLS/EAP-Tunneled Transport Layer Security (TTLS) authentication method may be used for the authentication between the UE 206 and the 5GC network 210/AAA-P. The 3GPP network/5G network 202 may consider requiring support for the EAP-TLS/EAP-TTLS for Wi-Fi only UEs 206 in the PLMN networks to enable providing 5G services on such Wi-Fi only UEs 206 across different geographic deployments. In such cases, using the AAA-P for authentication of the UE 206 may eliminate a need of supporting EAP-TLS/EAP-TTLS for such devices across roaming partners.

Figure 11:
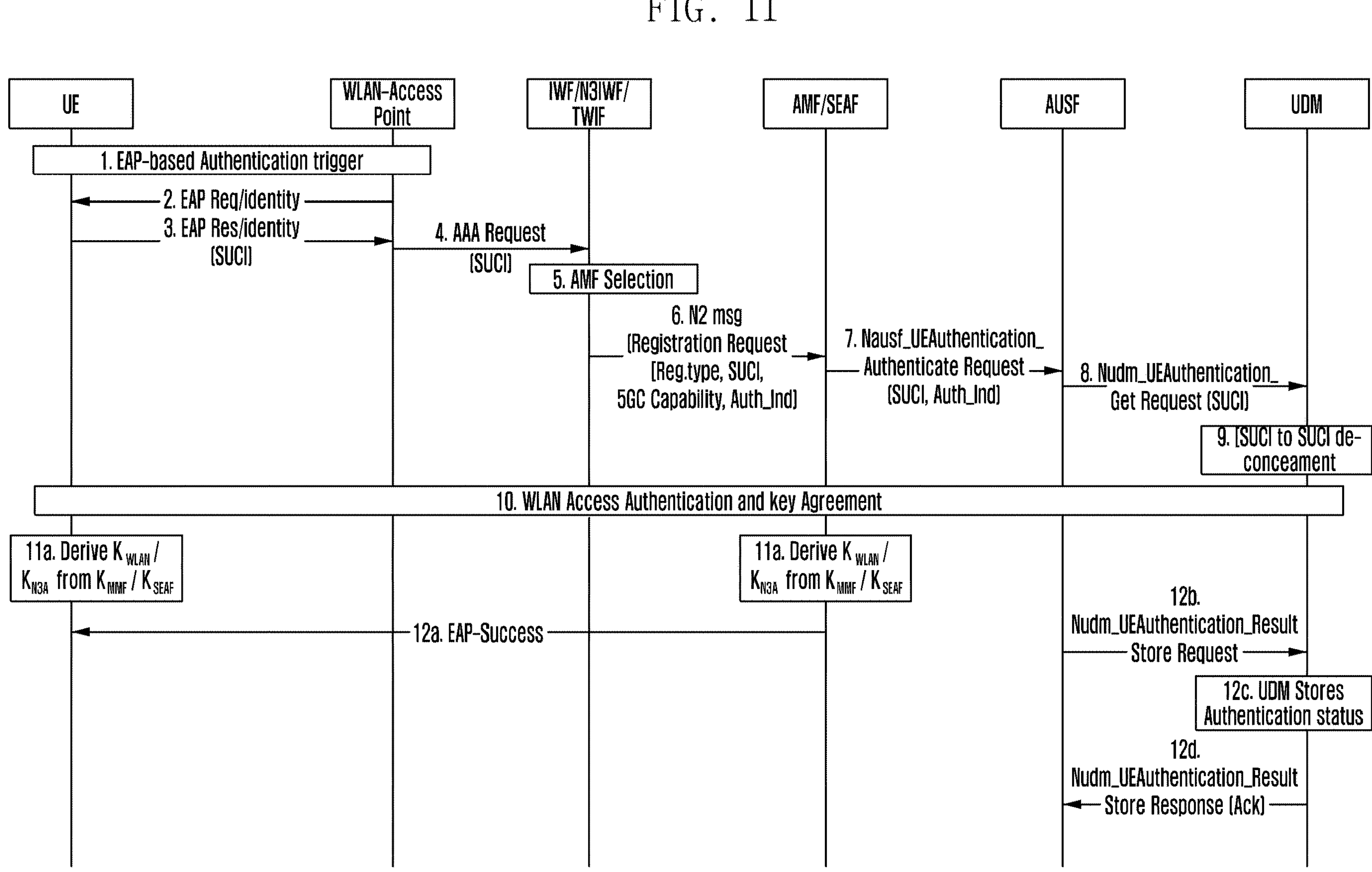
FIG. 11 is another example sequence diagram depicting the authentication between the UE and the AAA-S/AUSF/UDM when accessing the "WLAN 3GPP IP Access" services after the WLAN access authentication by which the AMF derives the key KWLAN, according to embodiments as disclosed herein.

FIG. 11 is another example sequence diagram depicting the authentication between the UE 206 and the AAA-S/AUSF/UDM when accessing the "WLAN 3GPP IP Access" services after the WLAN access authentication by which the AMF 216 derives the key KWLAN, according to embodiments as disclosed herein. As depicted in FIG. 11, the AUSF 212 does not receive an indication to not to store a key KAUSF, as a NAS procedure is not performed. Further, the authentication related information (for example, the result of authentication) may be stored at the UDM 214.

At step 1, the UE 206 associates with the WLAN AP 220 (for example herein the WLAN AP 220 is the trusted AP) and the EAP-AKA' authentication procedure may be initiated. At steps 2-4, the UE 206 provides the NAI to the WLAN AP 220. The WLAN AP 220 selects the N3IWF 218 and sends an AAA request to the selected N3IWF 218.

At steps 5-6, the N3IWF/Trusted WLAN Interworking Function (TWIF) 218 selects the AMF 216 and optionally creates a 5GC registration request message on behalf of the UE 206, if the UE 206 does not support the NAS procedure. The N3IWF/TWIF 218 uses default values to populate parameters (for example, a 5G GUTI) in the 5GC registration request message. Additionally, the N3IWF/TWIF 218 includes an authentication indication (Auth_ind). The authentication indication may indicate that the NAS procedure has not to be performed (i.e., there is no NAS security). In an embodiment, the NAS procedure may continue using a NULL security method. In an embodiment, the N3IWF 218 only supports the UE 206, which does not support the NAS procedure.

At step 8, the AMF 216 triggers the authentication procedure by sending the request to the AUSF 212 by sending the Nausf_UEAuthentication_Authenticate Request message. The Nausf_UEAuthentication_Authenticate Request message includes the SUCI of the UE 206 and the Auth_Ind.

At step 9, the AUSF 212 sends the Nudm_UEAuthentication_Get Request to the UDM 214 including the SUCI of the UE 206. Upon reception of the Nudm_UEAuthentication_Get Request, the UDM/SIDF 214 de-conceals the SUCI to obtain the SUPI before the UDM 214 may process the Nudm_UEAuthentication_Get Request.

At step 10, the WLAN access authentication procedure may be triggered between the UE 206 and the 5GC network 210/UDM 214. At step 11, after authenticating the UE 206 (i.e., 802.1x using EAP-AKA/EAP-TLS), the AMF/SEAF 216 derives the key KWLAN/KN3A from the key KSEAF or the key KAMF and stores the key KWLAN/KN3A.

At step 12, after the successful authentication of the UE 206, the UE 206 initiates the tunnel establishment procedure. Additionally, the AUSF 212 stores an authentication status at the UDM 214. The AUSF 212 does not store the authentications status at the UDM 214, if the AUSF 212 receives the Auth_Ind to not to store the key KAUSF.

Embodiments herein further describe derivation of the tunnel session key for the WLAN radio interface protection/tunnel establishment procedure. The tunnel session key KWLAN/KN3A may be derived using the MSK/EMSK derived during the previous authentication. Various exemplary methods used to derive the tunnel session key is described below and may be applicable to all the above-described WLAN access authentication procedure/non-3GPP network access authentication based on the entity, which derives the tunnel session key KWLAN/KN3A.

In an example, the tunnel session key KWLAN/KN3A may be derived as:

$$KWLAN/KN3A = KDF\{EMSK, W\text{-}APN, \text{Length of the Key}\}$$

In another example, the tunnel session key KWLAN/KN3A may be derived as:

$$KWLAN/KN3A = KDF\{EMSK, \text{"}W - APN\text{"}, SUPI/NAI\,5\text{-}GUTI, \text{Length of the Key}\}$$

In another example, the tunnel session key KWLAN/KN3A may be derived as:

$$KWLAN/KN3A = KDF\{EMSK, \text{"}W - APN\text{"}, SUPI/NAI/5\text{-}GUTI, RI, \text{Length of the Key}\}$$

In another example, the tunnel session key KWLAN/KN3A may be derived as:

$$KWLAN/KN3A = KDF\{MSK, W\text{-}APN, SUPI/NAI/5G\text{-}GUTI, \text{Length of the Key}\},$$

wherein the EMSK is the key KAUSF and MSK is the key KN3A/KWLAN

In another example, the tunnel session key KWLAN/KN3A may be derived as:

$$KWLAN/KN3A = KDF\{KAMF, W\text{-}APN, SUPI/NAI/5G\text{-}GUTI, \text{Length of the Key}\}$$

In another example, the tunnel session key KWLAN/KN3A may be derived as:

$$KWLAN/KN3A = KDF\{KSEAF, W\text{-}APN, SUPI/NAI/5G\text{-}GUTI, \text{Length of the Key}\}$$

In another example, the tunnel session key KWLAN/KN3A may be derived as:

$$KWLAN/KN3A = KDF\{KSEAF/KAMF/MSK/EMSK, [\text{MAC-Address of } UE], W\text{-}APN, SUPI/NAI/5G\text{-}GUTI, \text{Length of the Key}\}$$

Figure 12:
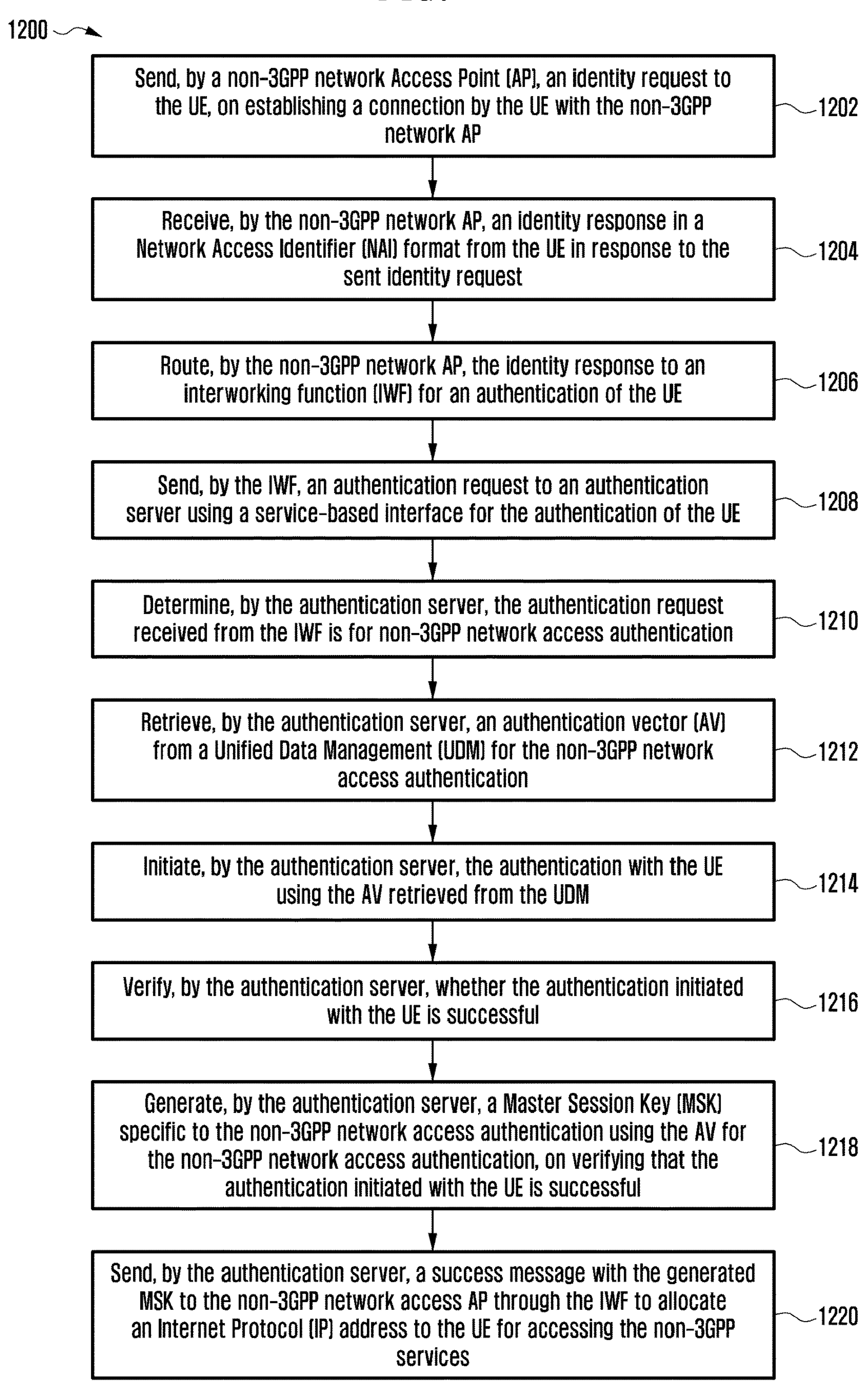
FIG. 12 is a flowchart depicting a method for authenticating the UE using the 3GPP subscription credential for accessing the non-3GPP services from the non-3GPP network, according to embodiments as disclosed herein.

FIG. 12 is a flowchart depicting a method 1200 for authenticating the UE 206 using the 3GPP subscription credential for accessing the non-3GPP services from the non-3GPP network 204, according to embodiments as disclosed herein.

At step 1202, the method includes sending, by the non-3GPP network AP 220, the identity request to the UE 206, on establishing the connection by the UE 206 with the non-3GPP network AP 220. At step 1204, the method includes receiving, by the non-3GPP network AP 220, the identity response in the NAI format from the UE 206 in response to the sent identity request.

At step 1206, the method includes routing, by the non-3GPP network AP 220, the identity response to the IWF 218 for the authentication of the UE 206. At step 1208, sending, by the IWF 218, the authentication request to the authentication server 212 using the service-based interface for the authentication of the UE 206.

At step 1210, the method includes determining, by the authentication server 212, the authentication request received from the IWF 218 is for the non-3GPP network access authentication. At step 1212, the method includes retrieving, by the authentication server 212, the AV from the UDM 214 for the non-3GPP network access authentication.

At step 1214, the method includes initiating, by the authentication server 212, the authentication with the UE 206, using the AV retrieved from the UDM 214. At step 1216, the method includes verifying, by the authentication server 212, whether the authentication initiated with the UE 206 is successful. On verifying that the authentication initiated with the UE 206 is successful, at step 1218, the method includes generating, by the authentication server 212, the MSK specific to the non-3GPP network access authentication. At step 1220, the method includes sending, by the authentication server, a success message with the generated MSK to the non-3GPP network access AP 220 through the IWF 218 for allocating the IP address for the UE 206 to access the non-3GPP services. The various actions in method 1200 may be performed in the order presented, in a different order or simultaneously. Further, in some embodiments, some actions listed in FIG. 12 may be omitted.

Figure 13:
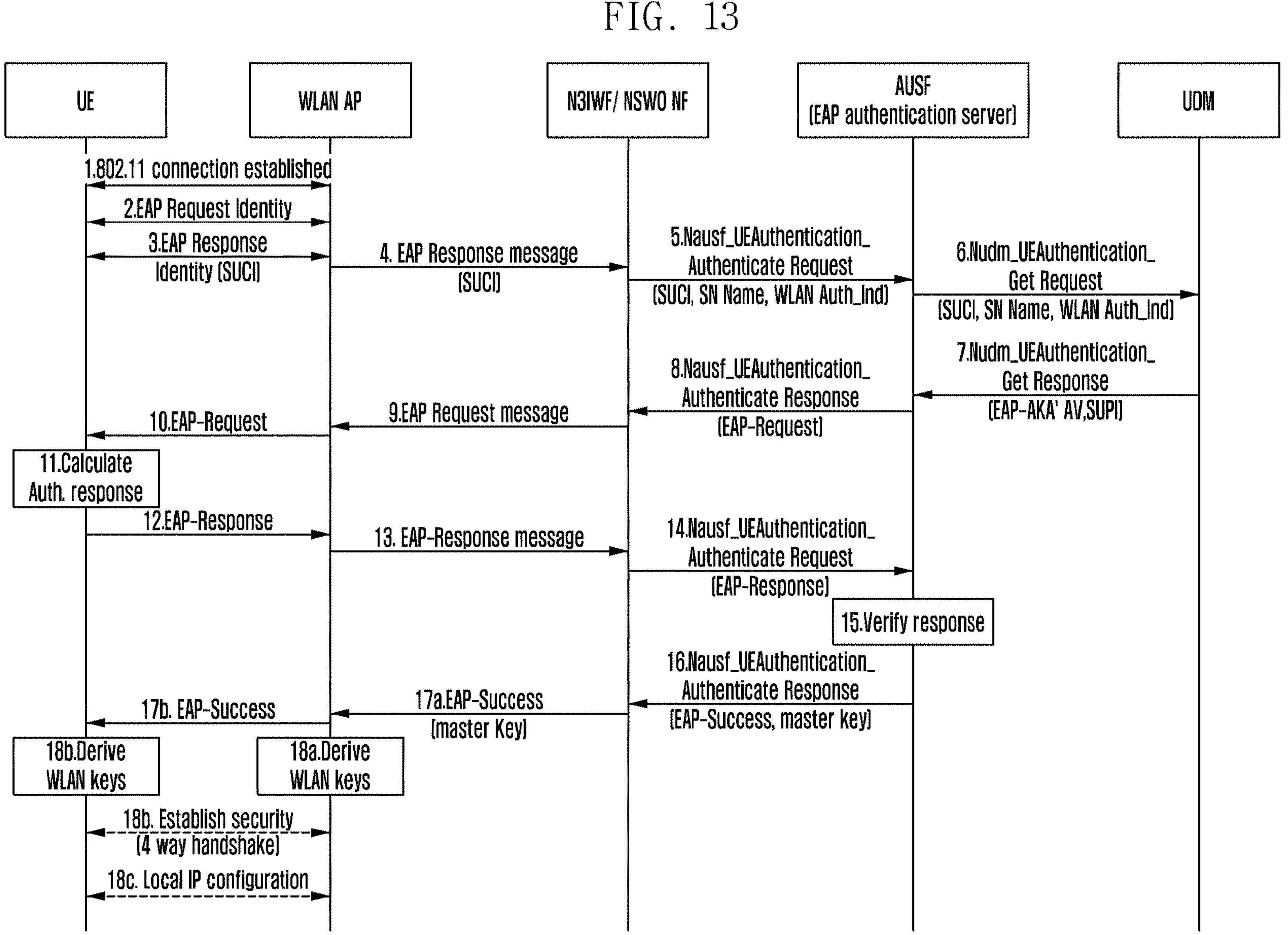
FIG. 13 is an example sequence diagram depicting the authentication of the UE, wherein the IWF interfaces with the AUSF directly and the AUSF derives the MSK (a security credential), according to embodiments as disclosed herein.

FIG. 13 is an example sequence diagram depicting the authentication of the UE 206, wherein the IWF 218 interfaces with the AUSF 212 directly and the AUSF 212 derives the MSK (a security credential), according to embodiments as disclosed herein.

At step 1, the UE 206 establishes the connection with the WLAN AP 220 using the wireless technology specific procedure (for example, a WLAN connection establishment based on IEEE 802.11).

At step 2, the WLAN AP 220 sends the EAP request/identity request to the UE 206. The EAP packets/EAP request may be transported over the Wireless LAN interface encapsulated within the Wireless LAN technology specific protocol.

At step 3, the UE 206 sends the EAP response/identity message to the WLAN AP 220. The UE 206 sends the identity complying with the NAI to the WLAN AP 220. The UE 206 always sends the SUCI in the NAI/NAI format (i.e., username@realm format, for example, typeX.rid678.schid1.hnkey27.ecckey<ECC ephemeral public key>.cip<encryption of user17>.mac<MAC tag value>@example.com), irrespective of whether a SUPI type is configured on a Universal Subscriber Identity Module (USIM) of the UE 206 is an International Mobile Subscriber Identity (IMSI) or the NAI.

Consider an example scenario, wherein the IMSI may be assumed as 234150999999999, where a Mobile Country Code (MCC)=234, a Mobile Network Code (MNC)=15 and a Mobile Station Integrated Services Digital Network=0999999999 with a routing Indicator of 678, and a Home Network Public Key Identifier of 27. In such a scenario, the SUCI of the type IMSI for a NULL protection scheme may be composed of:

0 or x, 678, 0, 0, 0999999999@234, 15 or 0 or x, 678, 0, 0, 0999999999@example.com, where example.com is the domain name of a PLMN with the MCC=234 and the MNC=15;

the SUCI for a Profile <A> protection scheme is composed of:

0 or x, 678, 1, 27, <EEC ephemeral public key value>, <encryption of 0999999999> and <MAC tag value>@234, 15 or 0 or x, 678, 1, 27, <EEC ephemeral public key value>, <encryption of 0999999999> and <MAC tag value>@example.com In an embodiment, the UE 206 may always send the SUCI in the NAI format, if the UE 206 is about to perform the WLAN access authentication (even though the valid 5G-GUTI is available, as the AMF 216 is not involved or to avoid a new procedure of retrieval of the SUPI from the 5G-GUTI).

At step 4, the WLAN AP 220 selects the IWF 218 and sends the EAP request to the selected IWF 218. The WLAN AP 220 includes the EAP identity response, and the NAI containing the SUCI in the EAP request sent to the IWF 218. In an embodiment, the IWF 218 acts as the AAA-P between the AUSF 212 and the WLAN AP 220.

At step 5, the IWF 218 sends the UE Authentication Request message (for example, Nausf_UEAuthentication_Authenticate Request) with the SUCI, a serving network name and the WLAN-Auth or the Auth-Ind indication towards the AUSF/AAA-S 212. The UE Authentication Request message is routed towards the designated AUSF 212 based on the realm part of the NAI and/or the routing identifier. The WLAN-Auth or Auth-Ind indication included in the UE Authentication Request message conveys the information to the AUSF 212 that the authentication procedure may be triggered for non-seamless WLAN offload purposes. In an embodiment, the UE Authentication Request message is being a new message (new service provided by AUSF 212) and the new message is an implicit indication indicating that the authentication procedure is triggered for the non-seamless WLAN offload purposes. In another embodiment, the IWF 218 converts the SUCI in the NAI format to a legacy format, as not to have further impact to the authentication server/AUSF 212 and the UDM 214 to handle to the SUCI in the NAI format.

At step 6, the AUSF 212 (also be referred as an EAP authentication server) sends the EAP response identity request to the UDM 214 including the SUCI and the WLAN-Auth or the Auth-Ind indication. In an embodiment, the UE Authentication Get Request message is being a new message (new service provided by UDM 214) and the new message is the implicit indication depicting that the authentication procedure is triggered for the non-seamless WLAN offload purposes. In another embodiment, the AUSF 212 converts the SUCI in the NAI format to the legacy format (if it is not modified by the IWF 218), as not to have further impact to the UDM 214 to handle the SUCI in the NAI format.

At step 7, upon reception of the UE Authentication Get Request message (for example, a Nudm_UEAuthentication_Get Request), the UDM 214 invokes the SIDF if the SUCI is received. The SIDF de-conceals the SUCI to obtain the SUPI before the UDM 214 may process the Authentication Get Request message. The UDM 214 generates the EAP-AKA' AV (RAND, AUTN, XRES, CK' and IK') and sends the EAP-AKA' AV along with the SUPI to the AUSF 212 in a Nudm_UEAuthentication_Get Response message.

At step 8, the AUSF 212 stores the expected response value (XRES) for future verification. The AUSF 212 sends the EAP request message to the IWF 218 in a Nausf_UEAuthentication_Authenticate Response message.

At step 9, the IWF 218 sends the EAP request to the WLAN AP 220. At step 10, the WLAN AP 220 forwards the EAP request message to the UE 206. At step 11, the UE 206 verifies the freshness of the AV by checking if an AUTN may be accepted as described in the 3GPP specification TS 33.102. If the AUTN may be accepted, the UE 206 computes the response value (RES). The UE 206 derives the CK' and the IK', according to the 3GPP specification TS 33.501 Annex A.3.

In an embodiment, the UE 206 derives the MSK and the EMSK, as described in the RFC 5448. The UE 206 may use the MSK as the pre-shared key for a 4-way handshake, when the UE 206 is using the NSWO. When the UE 206 is using the NSWO, the UE 206 does not generate the key KAUSF.

At step 12, the UE 206 sends the EAP response message to the WLAN AP 220. At step 13, the WLAN AP 220 forwards the EAP response message to the IWF 218. At step 14, the IWF 218 sends the Nausf_UEAuthentication_Authenticate Request with the EAP response message to AUSF 212.

At step 15, the AUSF 212 verifies if the received response value (RES) from the UE 206 matches with the stored and expected response value (XRES). At step 16, the AUSF 212 derives the required MSK key from the CK' and the IK', as per an Annex F of the 3GPP specification TS 33.501 and the EMSK as described in the RFC 5448. The AUSF 212 sends the Nausf_UEAuthentication_Authenticate Response message with an EAP-success message (i.e., the success message) along with the MSK key to IWF 218. At step 17, when the AUSF 212 performs the NSWO specific authentication, the AUSF 212 does not generate the key KAUSF. At step 18, the IWF 218 sends the EAP success message along with the MSK to the WLAN AP 220. The WLAN AP 220 forwards the EAP success message to the UE 206. The MSK is passed on by the IWF 218 to the WLAN AP 220.

Further, the WLAN keys may be generated in the UE 206 and the WLAN AP 220 independently. After the successful authentication, the UE 206 may be allocated with the IP address and may initiate the tunnel establishment procedure (along with the tunnel establishment procedure, wherein the 5GC registration procedure may also be performed).

The embodiments disclosed herein can be implemented through at least one software program running on at least one hardware device and performing network management functions to control the elements. The elements shown in FIGS. 2-4 can be at least one of a hardware device, or a combination of hardware device and software module.

The embodiments herein disclose methods and systems for authenticating UE for accessing non-3GPP services. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in at least one embodiment through or together with a software program written in e.g. Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments and examples, those skilled in the art will recognize that the embodiments and examples disclosed herein can be practiced with modification within the spirit and scope of the embodiments as described herein.

INDUSTRIAL APPLICABILITY

The present disclosure may be used when authenticating the UE when the UE accesses the 3GPP network through the non-3GPP network.

The invention claimed is:

1. A method performed by a non-seamless wireless local area network (WLAN) offload (NSWO) function (NSWOF) entity in a wireless communication system, the method comprising:

receiving, from a WLAN access network (AN), an extensible authentication protocol (EAP) identity (ID) response message including a subscription concealed identifier (SUCI) in a network access identifier (NAI) format;

transmitting, to an authentication server function (AUSF) entity, a first authentication request message including the SUCI and a NSWO indicator, wherein the NSWO indicator is used to indicate that the first authentication request message is for a NSWO;

receiving, from the AUSF entity, a first authentication response message including an EAP request message;

transmitting, to the AUSF entity, a second authentication request message including an EAP response message; and receiving, from the AUSF entity, a second authentication response message including an EAP success message and a master session key (MSK) key, wherein the MSK key is based on the NSWO indicator.

2. The method of claim 1, wherein the NSWOF entity acts as a service based interface (SBI) and an authentication, authorization, and accounting (AAA) proxy between the AUSF entity and the WLAN AN.

3. The method of claim 1, further comprising:

transmitting, to the WLAN AN, the EAP success message and the MSK key.

4. The method of claim 1, further comprising:

transmitting, to the WLAN AN, the EAP request message; and receiving, from the WLAN AN, the EAP response message.

5. A method performed by a wireless local area network (WLAN) access network (AN) in a wireless communication system, the method comprising:

transmitting, to a user equipment (UE), an extensible authentication protocol (EAP) identity (ID) request message;

receiving, from the UE, an EAP ID response message including a subscription concealed identifier (SUCI) in a network access identifier (NAI) format;

transmitting, to a non-seamless wireless local area network (WLAN) offload (NSWO) function (NSWOF) entity, the EAP ID response message including the SUCI;

receiving, from the NSWOF entity, an EAP request message;

transmitting, to the NSWOF entity, the EAP response message; and receiving, from the NSWOF entity, an EAP success message and a master session key (MSK) key.

6. The method of claim 5, wherein the NSWOF entity acts as a service based interface (SBI) and an authentication, authorization, and accounting (AAA) proxy between an authentication server function (AUSF) entity and the WLAN AN.

7. The method of claim 5, wherein transmitting the EAP ID response message is based on a realm part of the SUCI.

8. The method of claim 5, wherein the MSK key is based on a NSWO indicator.

9. The method of claim 8, further comprising:

transmitting, to the UE, the EAP request message; and receiving, from the UE, an EAP response message.

10. A non-seamless wireless local area network (WLAN) offload (NSWO) function (NSWOF) entity in a wireless communication system, the NSWOF entity comprising:

a transceiver; and a controller configured to:

receive, from a WLAN access network (AN), an extensible authentication protocol (EAP) identity (ID) response message including a subscription concealed identifier (SUCI) in a network access identifier (NAI) format, transmit, to an authentication server function (AUSF) entity, a first authentication request message including the SUCI and a NSWO indicator, wherein the NSWO indicator is used to indicate that the first authentication request message is for a NSWO, receive, from the AUSF entity, a first authentication response message including an EAP request message, transmit, to the AUSF entity, a second authentication request message including an EAP response message, and receive, from the AUSF entity, a second authentication response message including an EAP success message and a master session key (MSK) key, wherein the MSK key is based on the NSWO indicator.

11. The NSWOF entity of claim 10, wherein the NSWOF entity acts as a service based interface (SBI) and an authentication, authorization, and accounting (AAA) proxy between the AUSF entity and the WLAN AN.

12. The NSWOF entity of claim 10, wherein the controller is further configured to:

transmit, to the WLAN AN, the EAP success message and the MSK key.

13. The NSWOF of claim 12, wherein the controller is further configured to:

transmit, to the WLAN AN, the EAP request message, and receive, from the WLAN AN, the EAP response message.

14. A wireless local area network (WLAN) access network (AN) in a wireless communication system, the WLAN AN comprising:

a transceiver; and a controller configured to:

transmit, to a user equipment (UE), an extensible authentication protocol (EAP) identity (ID) request message, receive, from the UE, an EAP ID response message including a subscription concealed identifier (SUCI) in a network access identifier (NAI) format, transmit, to a non-seamless wireless local area network (WLAN) offload (NSWO) function (NSWOF) entity, the EAP ID response message including the SUCI, receive, from the NSWOF entity, an EAP request message, transmit, to the NSWOF entity, the EAP response message, and receive, from the NSWOF entity, an EAP success message and a master session key (MSK) key.

15. The WLAN AN of claim 14, wherein the NSWOF entity acts as a service based interface (SBI) and an authentication, authorization, and accounting (AAA) proxy between the AUSF entity and the WLAN AN.

16. The WLAN AN of claim 14, wherein transmitting the EAP ID response message is based on a realm part of the SUCI.

17. The WLAN AN of claim 14, wherein the controller is further configured to:

receive, from the NSWOF entity, an EAP success message and a master session key (MSK) key, wherein the MSK key is based on a NSWO indicator.

18. The WLAN AN of claim 14, wherein the controller is further configured to:

transmit, to the UE, the EAP request message, and receive, from the UE, an EAP response message.

* * * * *